US010528533B2

United States Patent
Saini et al.

(10) Patent No.: US 10,528,533 B2
(45) Date of Patent: Jan. 7, 2020

(54) ANOMALY DETECTION AT COARSER GRANULARITY OF DATA

(71) Applicant: Adobe Inc., San Jose, CA (US)

(72) Inventors: Shiv Kumar Saini, Bangalore (IN); Trevor Paulsen, Lehi, UT (US); Moumita Sinha, Bangalore (IN); Gaurush Hiranandani, Karnataka (IN)

(73) Assignee: Adobe Inc., San Jose, CA (US)

( * ) Notice: Subject to any disclaimer, the term of this patent is extended or adjusted under 35 U.S.C. 154(b) by 305 days.

(21) Appl. No.: 15/428,523

(22) Filed: Feb. 9, 2017

(65) Prior Publication Data

US 2018/0225320 A1    Aug. 9, 2018

(51) Int. Cl.
*G06F 16/00*    (2019.01)
*G06F 16/215*    (2019.01)

(52) U.S. Cl.
CPC .................. *G06F 16/215* (2019.01)

(58) Field of Classification Search
CPC .......... G06F 16/35; G06F 17/18; G06F 11/00; G06F 11/0739; G06F 11/0772; G06F 11/079; G06F 11/3082; G06F 11/3476; G06F 11/3608; G06F 16/215
See application file for complete search history.

(56) References Cited

U.S. PATENT DOCUMENTS

| | | | | |
|---|---|---|---|---|
| 2003/0028350 A1* | 2/2003 | Seem | ...................... | G01D 4/14 702/179 |
| 2005/0055254 A1* | 3/2005 | Schmidtberg | .......... | G06Q 10/06 340/539.13 |
| 2006/0047617 A1* | 3/2006 | Bacioiu | ................ | G06K 9/6262 706/59 |
| 2012/0137367 A1* | 5/2012 | Dupont | ................... | G06F 21/00 726/25 |
| 2013/0304909 A1* | 11/2013 | Pappu | ..................... | H04L 43/04 709/224 |
| 2014/0229414 A1* | 8/2014 | Goldberg | ................. | G06N 5/04 706/46 |

(Continued)

OTHER PUBLICATIONS

Suh et al. "Echo-state conditional variational autoencoder for anomaly detection" (Year: 2016).*

(Continued)

*Primary Examiner* — Yicun Wu
(74) *Attorney, Agent, or Firm* — Kilpatrick Townsend & Stockton LLP

(57) ABSTRACT

Techniques are disclosed for identifying anomalies in small data sets, by identifying anomalies using a Generalized Extreme Student Deviate test (GESD test). In an embodiment, a data set, such as business data or a website metric, is checked for skewness and, if found to be skewed, is transformed to a normal distribution (e.g., by applying a Box-Cox transformation). The data set is checked for presence of trends and, if a trend is found, has the trend removed (e.g., by running a linear regression). In one embodiment, a maximum number of anomalies is estimated for the data set, by applying an adjusted box plot to the data set. The data set and the estimated number of anomalies is run through a GESD test, and the test identifies anomalous data points in the data set, based on the provided estimated number of anomalies. In an embodiment, a confidence interval is generated for the identified anomalies.

20 Claims, 14 Drawing Sheets

(56) References Cited

U.S. PATENT DOCUMENTS

| | | | | |
|---|---|---|---|---|
| 2014/0298098 | A1* | 10/2014 | Poghosyan | G06F 11/3452 |
| | | | | 714/37 |
| 2014/0372348 | A1* | 12/2014 | Lehmann | G06K 9/6265 |
| | | | | 706/12 |
| 2015/0341246 | A1* | 11/2015 | Boubez | H04L 43/0876 |
| | | | | 709/224 |
| 2016/0217378 | A1* | 7/2016 | Bellala | G06N 20/00 |
| 2016/0381068 | A1* | 12/2016 | Galula | H04L 63/123 |
| | | | | 726/23 |
| 2017/0339168 | A1* | 11/2017 | Balabine | G06F 16/951 |
| 2017/0353345 | A1* | 12/2017 | Grigoryan | H04L 41/064 |
| 2018/0039898 | A1* | 2/2018 | Saini | G06N 20/00 |
| 2018/0053109 | A1* | 2/2018 | Caffrey | G06N 7/005 |
| 2018/0324199 | A1* | 11/2018 | Crotinger | H04L 63/1425 |
| 2018/0365090 | A1* | 12/2018 | Ben Simhon | G06F 11/076 |

OTHER PUBLICATIONS

Box, George EP, Cox, David R., "An analysis of transformations." Journal of the Royal Statistical Society. Series B (Methodological) 1964, vol. 26, Issue 2, 43 pages.

Hubert, Mia, and Vandervieren, Ellen. "An Adjusted Boxplot for Skewed Distributions", Computational Statistics & Data Analysis, Aug. 15, 2008, vol. 52, Issue 12, 8 pages.

Simpson, Ross J., Johnson, Timothy A., and Amara, Ingrid A, "The Boxplot: an Exploratory Analysis Graph for Biomedical Publications", American Heart Journal, Dec. 1988, vol. 116, Issue 6 Part 1, 3 pages.

Rosner, Bernard, "Percentage Points for a Generalized Esd Manyoutlier Procedure", Technometrics, May 1983, vol. 25, No. 2, 9 pages.

Grubbs, Frank E. (1950). "Sample criteria for testing outlying observations". Annals of Mathematical Statistics, Mar. 1950, vol. 21, No. 1, 32 pages.

Real Statistics Using Excel, "Generalized Extreme Studentized Deviate Test" http://www.realstatistics.com/studentstdistribution/identifyingoutliersusingtdistributionigeneralizedextremestudentizeddeviatetesti, accessed on Jan. 30, 2017, 7 pages.

Martel, Andre R., "The Detection of Outliers in Nondestructive Integrations with the Generalized Extreme Studentized Deviate Test", Publications of the Astronomical Society of the Pacific, Mar. 2015, vol. 127, No. 949, 8 pages.

Kalamkar, Sanket S., Banerjee Ardish, Roychowdhury, Ananya, "Malicious User Suppression for Cooperative Spectrum Sensing in Cognitive Radio Networks Using Dixon's Outlier Detection Method", Communications National Conference on IEEE, Feb. 2012, 5 pages.

Leys, C., Ley C., Klein, O., Bernard, P., & Licata, L., "Detecting Outliers: Do Not Use Standard Deviation Around the Mean, Use Absolute Deviation Around the Median," Journal of Experimental Social Psychology, vol. 49, No. 4, Jul. 31, 2013, 3 pages.

* cited by examiner

ANOMALY DETECTION AT COARSER GRANULARITY OF DATA

TECHNICAL FIELD

This disclosure relates generally to the field of data analysis, and more specifically relates to anomaly detection in data sets.

BACKGROUND

When online services are used via networked computing environments, interactions with the online services generate data that indicate various characteristics regarding the use of these online services. For example, various electronic interactions via online services (e.g., page views, website visits, webpage reloads) automatically generate data describing these actions (e.g., numbers of page views or website visits for each day of a given time period). Analysis of this data can identify issues that impact the ability of the online service to provide end-user experiences of sufficiently quality, reliability, or both.

Data sets are created by associating groups of information generated by interactions with online services. A data set includes measurements (also, "points"), each of which describes an aspect of the information included in the data set. In some cases, anomalies (also, "outliers") are present in the data set. One example of analysis that may be performed on data sets generated by online services is anomaly detection. An anomaly includes a point or group of points having a measurement of an unusual event or metric. An example of an anomaly is an point in a data set that has a statistically significant deviation from a majority distribution. Anomaly detection may be performed on a data set (e.g., a network log) to detect, for example, impact of a change in function for a given online service (e.g., errors after an update), responsiveness of end users to certain online content, indications of malware or other suspicious activity, or any other metric indicating a performance level associated with an online service.

A user often wishes to analyze a data set to determine whether anomalies are present in the data set. For example, a website manager reviews a data set describing website performance information to identify unusual increases or decreases in website performance. The website manager makes decisions regarding the website's operation based on the identified anomalies, such as whether to temporarily decommission the website for maintenance. In some cases, decisions based on the identified anomalies impact a large number of people (e.g., website users), or have a large financial impact (e.g., loss of online service). It is desirable that analysis of the data set accurately identify anomalies present in the data.

Current anomaly-detection techniques use a Generalized Extreme Studentized Deviate test algorithm (also, "GESD test" or "GESD") to identify anomalies. However, the GESD test requires, as an input, an estimated number of anomalies. If the estimated number of anomalies is too low, actual anomalies in the data set are incorrectly identified as non-anomalous (e.g., false negatives). If the estimated number of anomalies is too high, actual non-anomalous points in the data set are incorrectly identified as anomalies (e.g., false positives). In addition, if the estimated number of anomalies is too high, additional iterations of the GESD algorithm are required, slowing the completion of the test and requiring additional computing resources. It is desirable to develop techniques to accurately and quickly identify anomalies. It is also desirable to develop techniques to correctly estimate the number of anomalies.

Other existing anomaly-detection techniques use training models to identify anomalies in data sets. The models are trained using historical data, then provided with the data set of interest for analysis. However, this approach is inadequate if a sufficient amount of historical data is not available, e.g., a smaller set of historical data with relatively few data points (e.g., 10-20 points). In some cases, the model is trained using historical data that is estimated to be similar to the data set of interest. But this approach introduces uncertainty regarding the accuracy of the analysis results, since the training data might not be as similar as estimated. In addition, a trained model requires a seasonal time period, such as a repeated pattern occurring over a time period (e.g., weekly or daily time series). However, not all data sets are related to time. In addition, not all data sets that are related to time have a seasonal pattern.

It is desirable to develop techniques to accurately identify anomalies in data sets (e.g., without false positives or false negatives). It is also desirable to develop techniques to correctly estimate the number of anomalies. It is also desirable to accurately identify anomalies in data sets that do not have historical data, such as smaller size data sets. It is also desirable to accurately identify anomalies in data sets that do not include a seasonal pattern.

SUMMARY

According to an embodiment, a data set is received by an anomaly identification system. In some cases, the data set includes a small number of data points (e.g., between 10 and 50 points), is trendless, and has a normal distribution. The data set is provided to an estimation module that accurately estimates a maximum number of anomalies for the data set. In some cases, the estimated maximum is provided by an adjusted box plot applied to the data set. The data set and the estimated maximum are provided to an anomaly identification module, which compares the values of points included in the data set. The number of comparisons performed and the number of values included in each comparison are based on the estimated maximum. The anomaly identification module identifies the anomalies that are present in the data set based on the performed comparisons. The identified anomalies are provided by the anomaly identification system. In some embodiments, a confidence level is provided to the anomaly identification module. A confidence interval is calculated for each identified anomaly based on the confidence level, and the calculated confidence intervals are provided by the anomaly identification system.

In some embodiments, a user interface is associated with the anomaly identification system. The user interface is capable of receiving an indication of the data set. In some cases, the user interface is capable of receiving an indication of one or more of a confidence level or a validation selection. In some embodiments, the identified anomalies, the calculated confidence intervals, or both are provided to the user interface, such as for display on a display device.

These illustrative embodiments are mentioned not to limit or define the disclosure, but to provide examples to aid understanding thereof. Additional embodiments are discussed in the Detailed Description, and further description is provided there

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
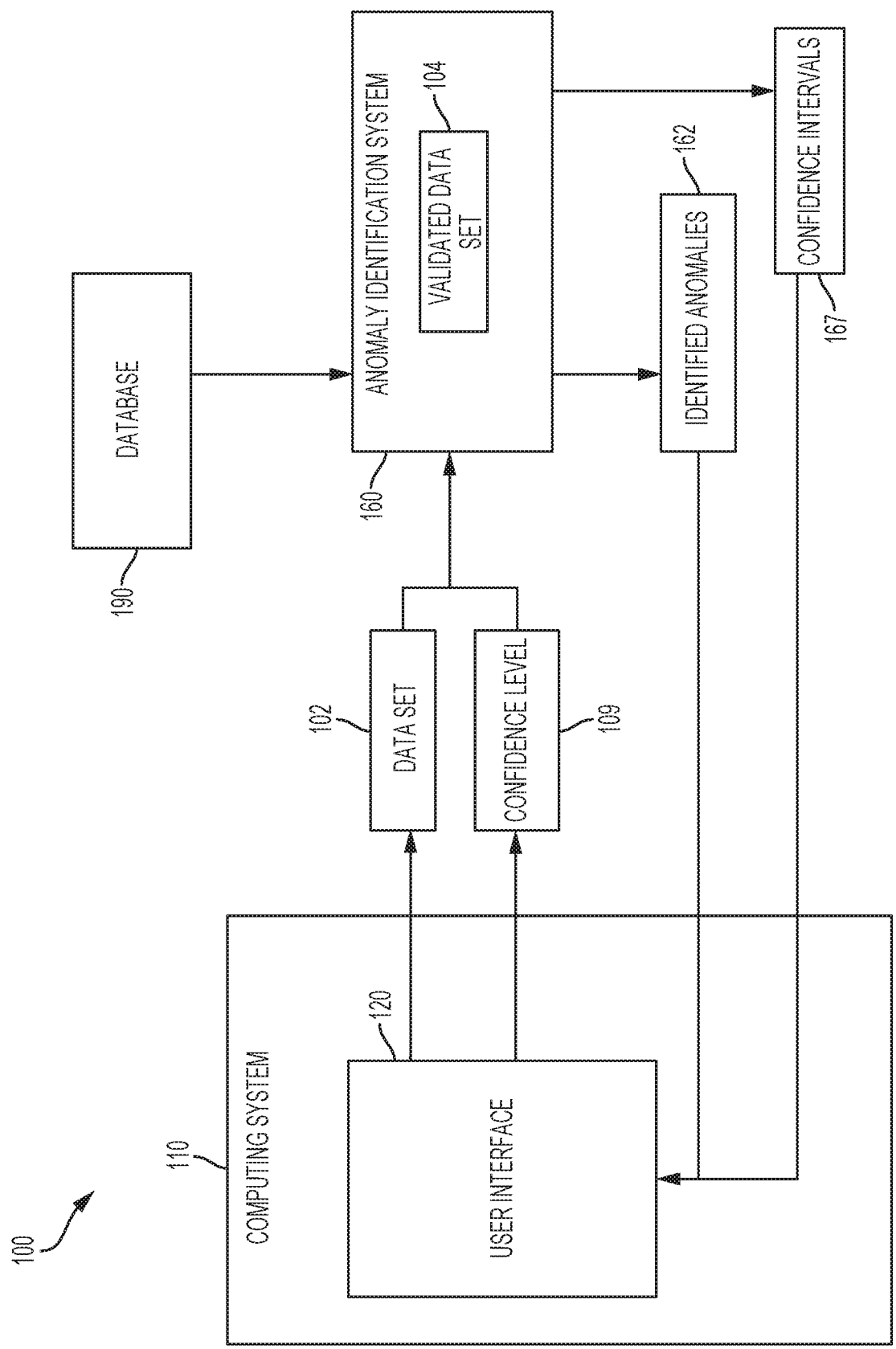
FIG. 1 is a block diagram depicting an exemplary environment in which techniques for identifying anomalies in a data set are practiced, according to certain embodiments.

Embodiments described herein include techniques for identifying anomalies in a data set, such as a small (e.g., 10-20 points) data set. As discussed above, prior techniques for identifying anomalies in data sets do not provide accurate identification of anomalies in smaller data sets. In some cases, techniques described herein include estimating a maximum number of potential anomalies in the data set by using an adjusted box plot to produce an accurate estimate. Additionally or alternatively, the anomalies in the data set are identified based on the estimated maximum number of potential anomalies, as estimated by the adjusted box plot. For example, a GESD test identifies anomalies based on received inputs, including the estimated maximum.

The following example is provided to introduce certain embodiments of the present disclosure. In this example, a data set is provided to the anomaly identification system. To accurately estimate of a maximum number of potential anomalies in the data set, the anomaly identification system applies a box plot to the data set. The box plot identifies one or more data points (e.g., data points falling outside the box interval) as potential anomalies in the data set. The anomaly identification system then identifies, based on the estimated maximum, one or more points in the data set as anomalies. For example, the anomaly identification system applies a GESD test, using the estimated maximum of anomalies as an input, to identify anomalies. The GESD test iteratively performs comparisons of points in the data set to determine if a particular point is an anomaly, where the number of iterations is based on the input estimated maximum.

Certain embodiments improve the operations of computing systems that perform anomaly detection. For example, by using an accurate estimate for a maximum number of anomalies, such as the accurate estimate provided by an adjusted box plot, enough iterations of the GESD test are performed to correctly identify anomalies in the data set. But limiting the number of iterations using the estimated maximum number of anomalies prevents unnecessary iterations of the GESD test (e.g., a greater number of iterations than potential anomalies). Thus, certain embodiments allow a computing system to perform anomaly detection in a manner that more efficiently utilizes processing resources (e.g., processing cycles, memory, etc.) that would otherwise be devoted to unnecessary iterations of the GESD test.

As used herein, the terms "data" and "data set" refer to a body of information. The body of information includes any category of information, such as website performance data, site visitor activity data, security data, demographic data, or any suitable type of data. In some embodiments, data sets comprise a body of information including measurements of the information. In some cases, the measurements are related to time, such as login attempts measured over time. Additionally or alternatively, the measurements are periodic (e.g., weekly site visitor measurement, test results of a manufactured product) or irregular (e.g., site visits after a promotional event, test results of a random sample of manufactured product). In some cases, a data set may be categorized by the quantity of points included in the data set. For example, a data set with 10-30 data points is considered a small data set. Additionally or alternatively, a data set with 50 or more data points is considered a large data set.

As used herein, the terms "point" and "data point" refer to a measurement included in a data set. In some cases, a point is associated with one or more values, including (without limitation) numeric values, text values, logical values (e.g., Booleans), multidimensional values (e.g., a database record), or any other suitable type of value. In some cases, a point with multiple values indicates a relationship between the values. For example, a point with a numeric value (e.g., 1.2 million site visits) and a time value (e.g., Jan. 1, 2017) indicates a relationship between the indicated number and the indicated date (e.g., site visits received on that date). Additionally or alternatively, a point includes information related to the value, such as a unit (e.g., currency used by a visitor), a timestamp, a source, or any other suitable information.

As used herein, the terms "anomaly" and "outlier" refer to a point having an atypical measurement. An anomalous point has a value that falls outside the typical range of values of other points included in the data set. For example, a data set with ten points has nine points with the value of 2.7 and a tenth point with the value of 4.8. In some cases, the tenth point in the exemplary data set is considered an anomaly.

In some cases, points are associated with confidence intervals. A point, including an anomalous point, has an associated confidence interval indicating a likelihood that the value of the point falls within a typical range of measurements. In some embodiments, a confidence level is associated with a data set. Based on the confidence level for the data set, confidence intervals are calculated for each point in the set.

In some cases, a data set has one or more attributes. Attributes of the data set include (without limitation) a presence of a trend, a distribution symmetry (e.g., normal or non-normal point distribution), or other suitable attributes. A trend indicates a tendency of values in the data set to change in a direction (e.g., upwards or downwards). In some cases, a trend indicates a tendency to change towards a particular value (e.g., a trend towards zero). Symmetry of data set indicates whether the distribution of points is normal or non-normal. For example, a normal distribution includes points that are grouped near a statistical mean and symmetrically distributed around the mean.

In an embodiment, a time period correction (also, "year-over-year correction") is applied to a data set. For example, a data set associated with a portion of a time period is compared with another data set associated with a similar portion of a different time period (e.g., comparing data from the fourth financial quarter of a year with the fourth financial quarter of the previous year). In some cases, the comparison includes subtracting the data associated with the previous time period with the data associated with the current time period. In some cases, a time period correction is applied to any suitable time period, including yearly, monthly, weekly, or hourly data, or data associated with any suitable duration of time.

In some cases, a data set is validated based on one or more attributes of the set, or on a correction applied to the set. For example, a validated data set is trendless and has a normalized distribution. In some cases, a validated data set has a time period correction applied. In some cases, a provided data set is analyzed to determine the presence of a trend, or a normal distribution, or both. If a trend or a non-normal distribution are determined for the provided data set, a validated data set is determined based on a removal of the trend, or a normalization of the distribution, or both. In an embodiment, the validated data set is used to estimate the maximum number of potential anomalies, or to identify anomalies, or both.

Referring now to the drawings, FIG. 1 is a diagram of an exemplary environment 100 in which one or more embodiments of the present disclosure are practiced. The environment 100 includes a computing system 110 with a user interface 120. FIG. 1 depicts the user interface 120 as included within the computing system 110, but other implementations are possible. For example, the user interface is operated as a networked application, such as via a web browser. The environment 100 also includes a database 190 and an anomaly identification system 160. FIG. 1 depicts the database 190 as associated with the anomaly identification system 160, but other implementations are possible. For example, the database 190 communicates with the computing system 110, such as via one or more networks (not depicted in FIG. 1).

In an embodiment, a user of the computing system 110 interacts with the anomaly identification system 160 via user interface 120. For example, the user provides one or more indications to the user interface 120 using an input device (e.g., a keyboard, mouse). Based on the provided indications, the anomaly identification system 160 receives a data set of interest, such as data set 102, or a desired confidence level, such as confidence level 109, or both. In some cases, the indicated data set or confidence level are received from the computing system 110. Additionally or alternatively, the indicated data set or confidence level are received from a data source, such as database 190.

The anomaly identification system 160 provides one or more identified anomalies 162 based on the received data set 102. In some cases, a validated data set 104 is prepared based on the received data set 102. Additionally or alternatively, the anomalies 162 are identified based on the validated data set 104. The identified anomalies 162 are received, such as the user interface 120. The user interface 120 provides the identified anomalies to the user, such as via a display device associated with computing system 110.

In some embodiments, the anomaly identification system 160 provides one or more confidence intervals 167 associated with the identified anomalies 162. The provided confidence intervals 167 are determined based on the received confidence level 109. Additionally or alternatively, the provided confidence intervals 167 are determined based on data set 102, validated data set 104, or both. Each anomaly included in the identified anomalies 162 has an associated confidence interval in the confidence intervals 167. The confidence intervals 167 are received, such as by the user interface 120. The user interface 120 provides the confidence intervals 167 to the user, such as via a display device. In some cases an association between the confidence intervals and the identified anomalies is displayed.

Figure 2:
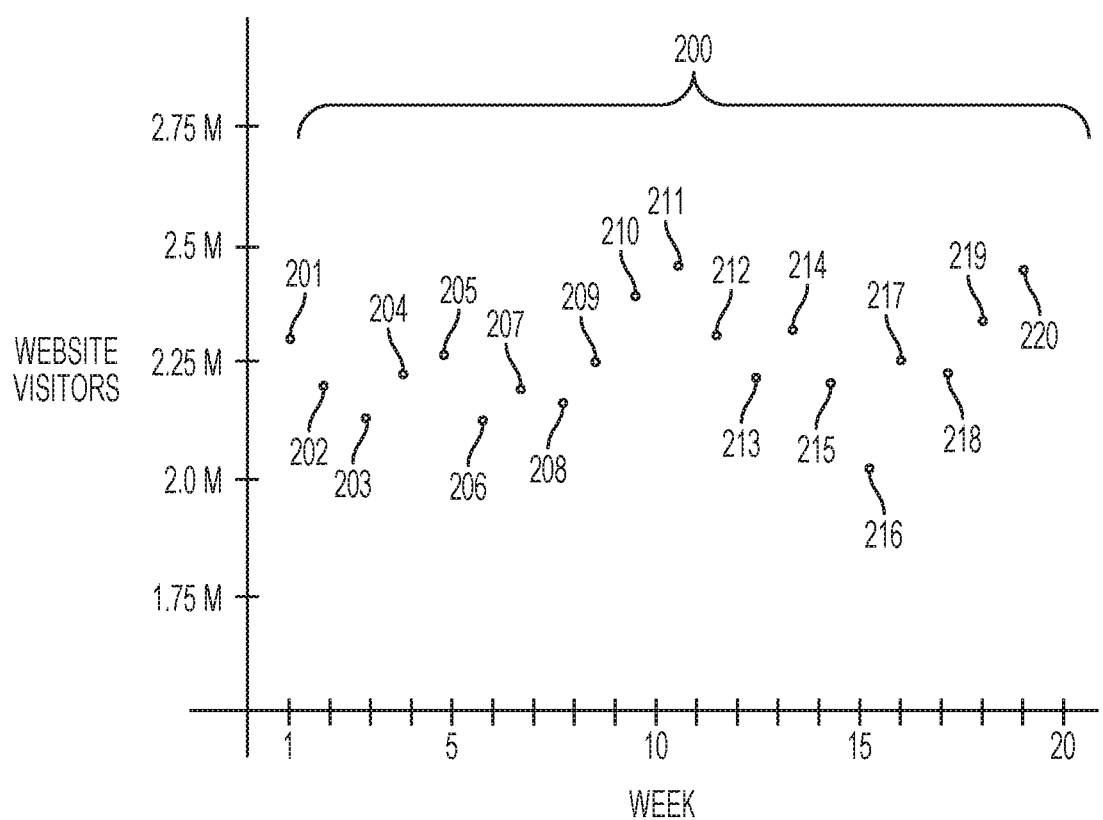
FIG. 2 is a diagram depicting an exemplary representation of a small data set having a normal distribution, according to certain embodiments.

In some embodiments, the data set of interest, such as data set 102, includes one or more data points. In some cases, the data set has attributes based on the points that are included in the data set. For example, the data set has a size attribute based on a quantity of data points included in the set. A data set having a quantity of 50 points has an attribute of a larger size. Additionally or alternatively, a data set having a quantity of 10-20 points has an attribute of a smaller size. FIG. 2 depicts a representation of an example small data set. The data set 200 includes data points 201 through 220. Each of the data points 201-220 has one or more values, such as a numeric value associated with a time value. In some cases, a data set having up to 50 data points has an attribute of a smaller size. Additionally or alternatively, the data set has attributes of a statistical mean and a standard deviation. The mean and the standard deviation are calculated based on one or more of the values of the included data points. For example, data set 200 has a mean and a standard deviation based on the numeric values of the data points 201-220.

Additionally or alternatively, the data set has a distribution attribute. The distribution attribute is based on the mean and the standard deviation of the data set. In some cases, the distribution of the data set is a normal distribution. For example, data set 200 has a normal distribution, such that the values of data points 201-220 are dispersed evenly around the mean of the data set 200.

Figure 3:
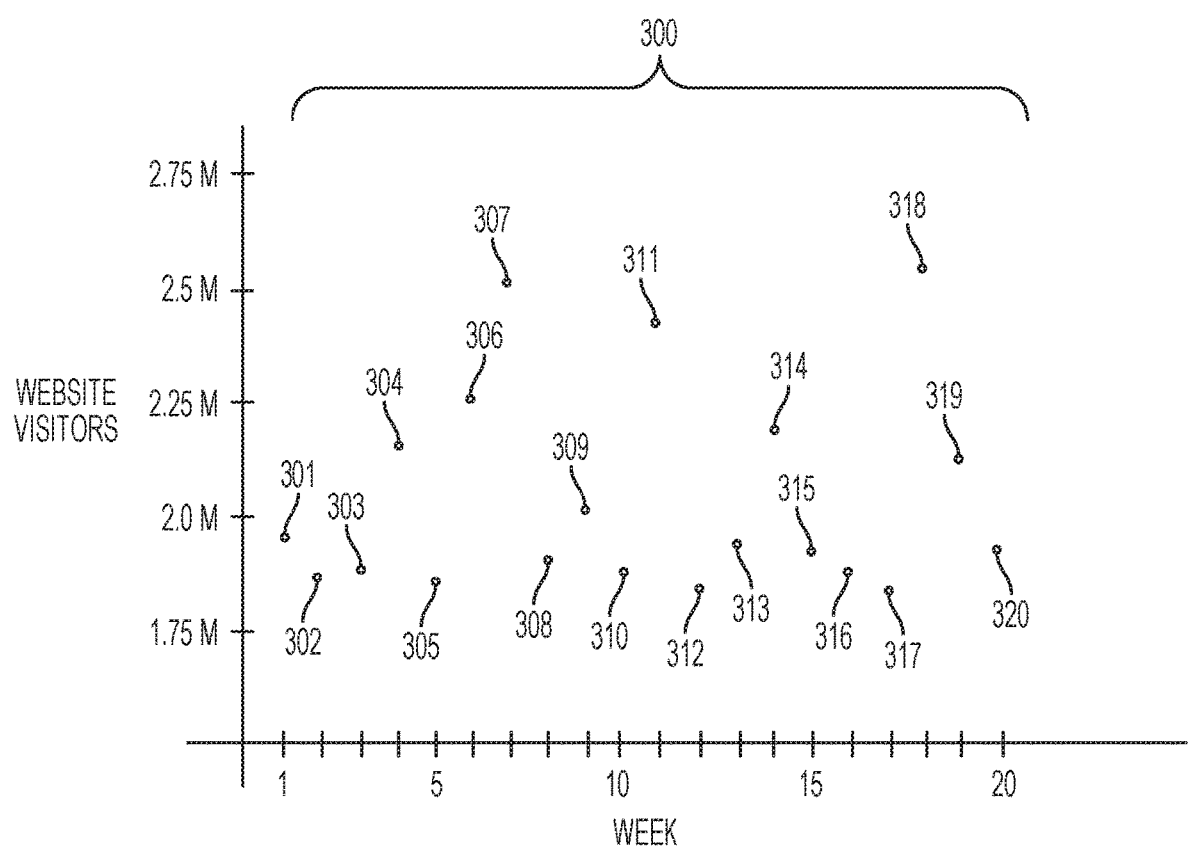
FIG. 3 is a diagram depicting an exemplary representation of a data set having a non-normal distribution, according to certain embodiments.

In some cases, the distribution of the data set is a non-normal distribution. FIG. 3 depicts a representation of an example data set with a non-normal distribution. The data set 300 includes data points 301 through 320, each point having one or more values. Data set 300 is non-normal, such that the values of data points 301-320 are dispersed unevenly around the mean of the data set 300.

Figure 4:
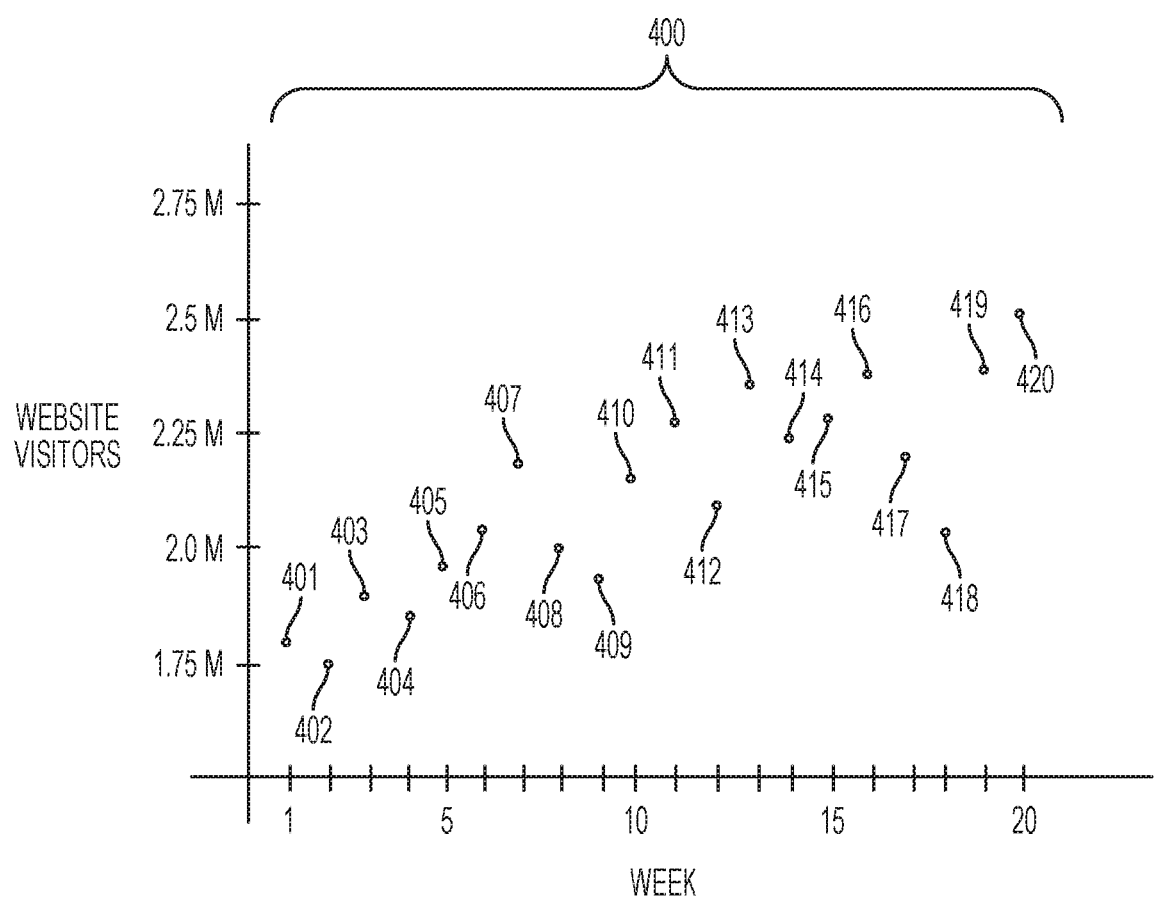
FIG. 4 is a diagram depicting an exemplary representation of a data set having a trend, according to certain embodiments.

Additionally or alternatively, the data set has a trend attribute. The trend attribute is based on values of points included in the data set, and indicates a tendency of the values to change in a direction. FIG. 4 depicts a representation of an example data set with an upward trend. The data set 400 includes data points 401 through 420, each point having one or more values. The values of the data points 401-420 have a tendency to change in an upward direction (e.g., towards positive infinity).

Figure 5:
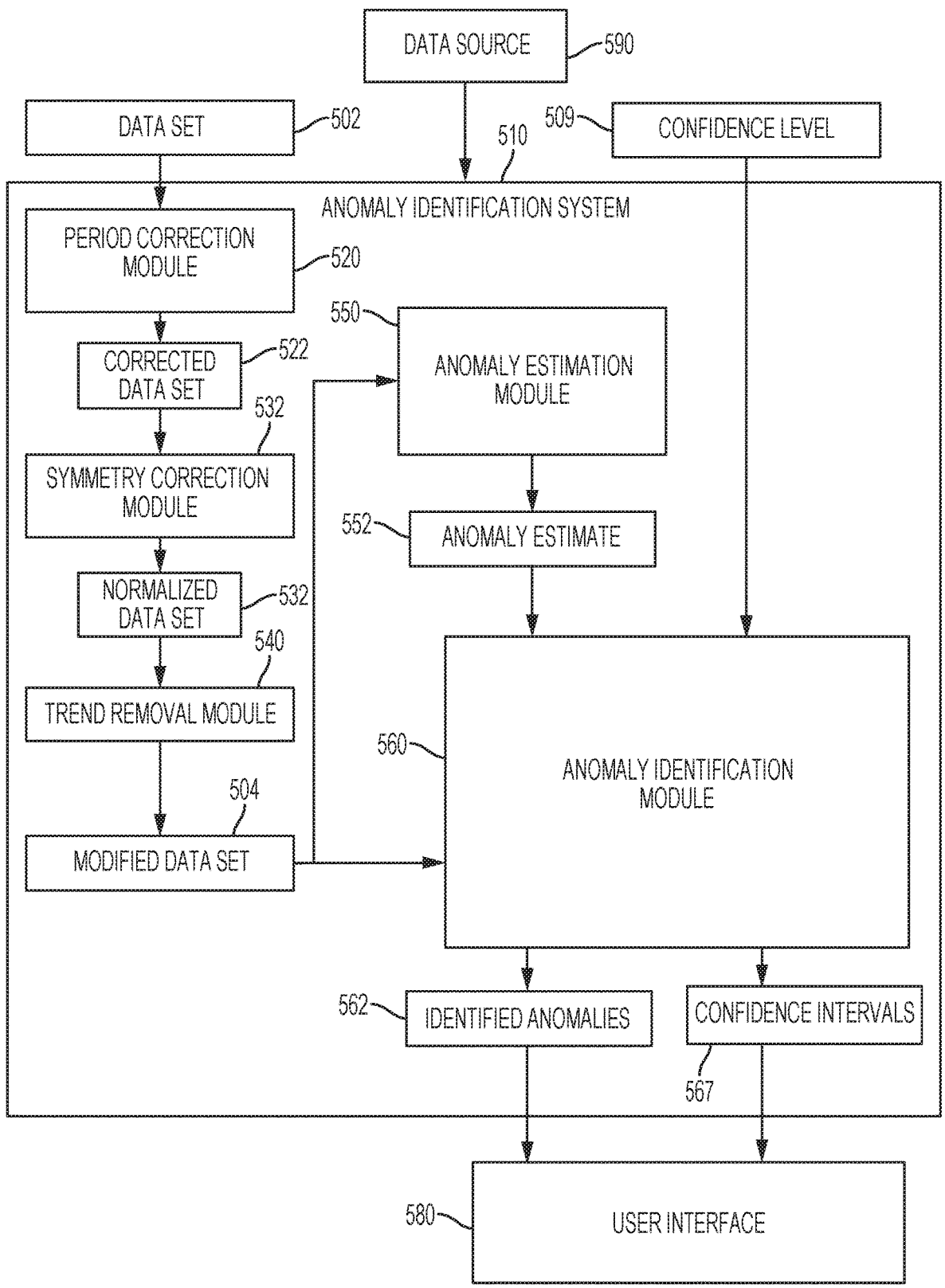
FIG. 5 is a block diagram depicting an exemplary anomaly identification system, according to certain embodiments.

FIG. 5 is a block diagram depicting an example of an anomaly identification system 510. In an embodiment, the anomaly identification system 510 includes anomaly estimation module 550 and an anomaly identification module 560. In some cases, the anomaly identification system 510 further includes one or more of a period correction module 520, a symmetry correction module 530, or a trend removal module 540. Other configurations are possible, however.

In one embodiment, the anomaly identification system 510 receives a data set of interest, such as data set 502. For example, the data set 502 is received from a user interface 580 associated with the system 510. Additionally or alternatively, the data set 502 is received from a data source 590, such as a database that is in communication with the anomaly edification system 510. In some cases, the data set 502 is a small data set, having between 10 and 20 data points.

In some embodiments, the data set 502 is provided to the period correction module 520. The period correction module 520 provides a corrected data set 522 based on the received data set 502 and related data from a previous time period correlated with data set 502. One non-limiting technique for period correction includes subtracting the values of the related data from the data set of interest, but other techniques are available. For example, the period correction module 520 provides the corrected data set 522 based on subtracting related data from a previous year from the data set 502. In some cases, one or more of the related data and an indication of the previous time period are received from either user interface 580, or data source 590, or both.

In some embodiments, the corrected data set 522 is provided to the symmetry correction module 530. The symmetry correction module 530 determines if the provided data set has a normal distribution. If the provided data set does not have a normal distribution, the symmetry correction module 530 transforms the data set to produce a normalized data set 532. One non-limiting technique for normalization includes applying a Box-Cox transformation, but other techniques are available. For example, the symmetry correction module 530 applies a Box-Cox transformation to the corrected data set 522 to produce the normalized data set 532. If the symmetry correction module 530 determines that the provided data set has a normal distribution, the normalized data set 532 is based on the provided data set without a transformation (e.g., corrected data set 522).

Additionally or alternatively, the normalized data set 532 is provided to the trend removal module 540. The trend removal module 540 determines if the provided data set includes one or more trends. One non-limiting technique to test for trends includes a Mann-Kendall test, but other techniques are available. For example, the trend removal module 540 applies a Mann-Kendall test to determine if a trend is present. If the provided data set includes a trend, the trend removal module 540 produces a data set with the trend removed, such as modified data set 504. One non-limiting technique to remove trends includes applying a linear regression to the data set, but other techniques are available. If the trend removal module 504 determines that the provided data set includes no trends, the modified data set 504 is based on the provided data set (e.g., normalized set 532).

In some embodiments, techniques related to one or more of the period correction module 520, symmetry correction module 530, or the trend removal module 540 are omitted or performed by systems other than anomaly identification system 510. For example, data set 502 is provided to symmetry correction module 530 without performing a period correction. Additionally or alternatively, the modified data set 504 is received from an additional computing system (not depicted in FIG. 5) or data source, such as data source 590.

In an embodiment, the modified data set 504 is received by an anomaly estimation module 550. The estimation module 550 determines an estimated maximum number of anomalies present in the modified data set 504, and provides anomaly estimate 552 based on the estimated maximum. For example, the estimation module 550 uses an adjusted box plot to produce the anomaly estimate 552.

Additionally or alternatively, the modified data set 504 and the anomaly estimate 552 are received by anomaly identification module 560. The identification module 560 identifies the anomalies in the data set of interest based on the modified data set 504 and the anomaly estimate 552. For example, the identification module 560 applies the GESD algorithm to the modified data set 504, using the anomaly estimate 552 as an input to the algorithm.

In some cases, the anomaly identification system 510 provides confidence intervals, such as confidence intervals 567, that are associated with the identified anomalies 562. A confidence level 509 is received by the anomaly identification system 510, such as from the user interface 580, and is provided to the anomaly identification module 560. Based on the received confidence level 509 and one or more outputs of the GESD test, the identification module 560 produces confidence intervals 567.

In some cases, the identification module 560 provides one or more of the identified anomalies 562 or the confidence intervals 567. For example, the identified anomalies 562 and confidence intervals 567 are received by the user interface 580, such as for display to a user. Additionally or alternatively, the identified anomalies 562 and confidence intervals 567 are received by additional systems, such as additional analysis systems, or by a data source, such as data source 590.

Time Period Correction

In some embodiments, a time period correction is applied to the data set of interest. For example, a data set of interest, such as site visits to an entertainment website, is associated with a portion of a time period, such as a particular day of the week (e.g., weekend). If the data varies from day to day during the week, such as for periodic cycles (e.g., increased website visits during leisure time), identifying anomalies based on the weekly period could result in incorrectly identifying anomalous or non-anomalous data points. In some cases, a time period correction is applied to the data set of interest to correctly identify anomalous and non-data points. In some cases, a time period correction is applied to any suitable time period, including yearly, monthly, weekly, or hourly data, or data associated with any suitable duration of time. For example, a data set associated with hourly data collected on a daily cycle (e.g., hourly logins to a webpage) has a time period correction applied based on corresponding hourly data from a previous day.

Figure 6:
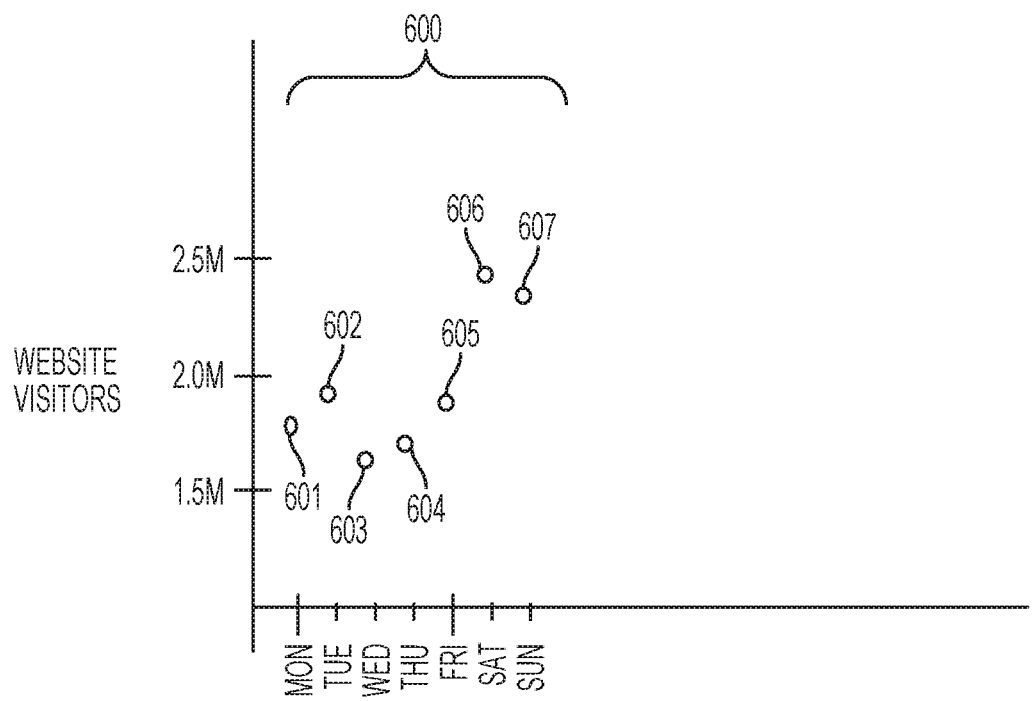
FIGS. 6 and 7 are diagrams depicting exemplary representations of data sets associated with similar time periods, according to certain embodiments.
Figure 7:
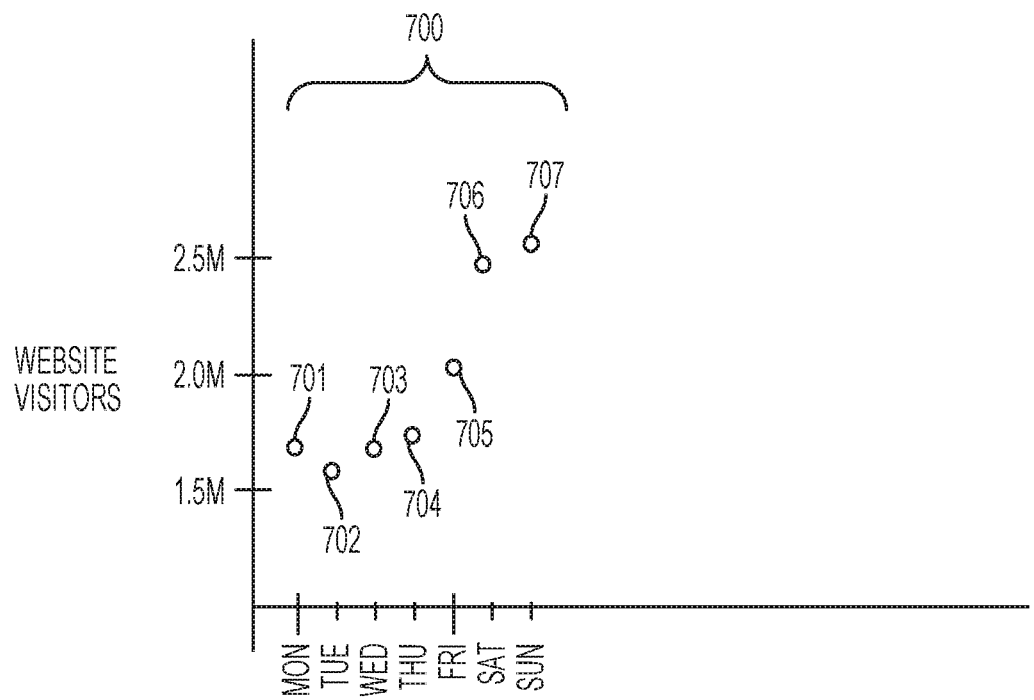

FIGS. 6 and 7 depict representations of example data sets associated with a similar one-week time period of particular months. FIG. 6 depicts data set 600 representing daily site visitor data for a particular week of a first month (e.g., June). FIG. 7 depicts data set 700 representing daily site visitor data for a particular week of a second month (e.g., July). In this example, the second month is the next month subsequent to the first month, but other relationships are possible. In some cases, a user understands that the variations in the data point values are due to typical periodic cycles of visitation data (e.g., increased visitors on weekends).

In FIG. 6, the data points 601-605 associated with the weekdays Monday through Friday have lower values, and the data points 606-607 associated with the weekend days Saturday and Sunday have higher values. Identifying anomalies based on data set 600 could incorrectly identify some of the data points as anomalous, such as data points 606 and 607.

In FIG. 7, the data points 701-704 associated with the weekdays Monday through Thursday have lower values, the data points 705 associated with the weekday Friday has a medium value, and the data points 706-707 associated with the weekend days Saturday and Sunday have higher values. Identifying anomalies based on data set 700 could incorrectly identify some of the data points as non-anomalous, such as data point 705.

Figure 8:
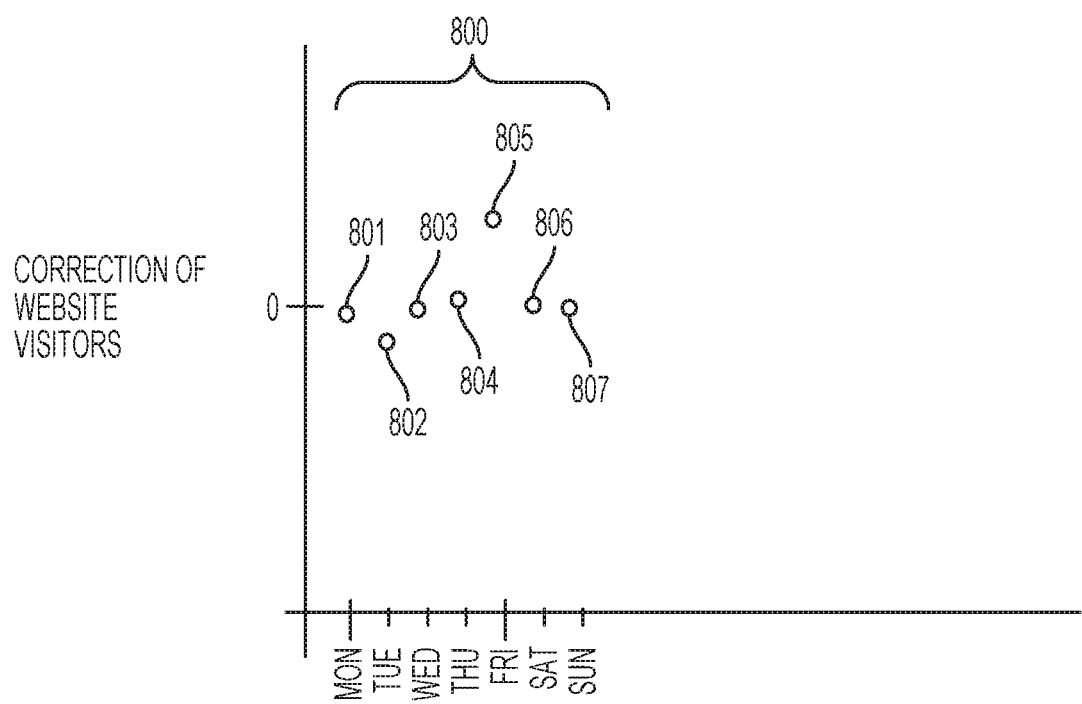
FIG. 8 is a diagram depicting an exemplary representation of a data set based on a time period correction, according to certain embodiments.

In an embodiment, applying a time period correction to the data set of interest reduces occurrences of data points incorrectly identified as anomalous or non-anomalous. For example, applying a time period correction includes subtracting values from corresponding data points of the previous period from the data points in the set of interest. FIG. 8 depicts a representation of an example data set based on a time period correction. FIG. 8 depicts data set 800, representing a time. Correction applied to the data set 700. The applied correction includes subtracting the values of points included in data set 600 from the corresponding values of points included in data sets 700. For example, data points 801-807 are based on subtracting the values of data points 601-607 from the respective values of data points 701-707. Identifying anomalies based on data set 800 could correctly identify anomalous points, such as 805.

In some embodiments, a time period correction is applied to a data set of interest, such as data set 502. Additionally or alternatively, a time period correction module, such as period correction module 520, performs a time period correction on a data set.

Distribution Normalization

In some embodiments, the data set of interest is tested for a normal distribution. For example, a data set having a non-normal distribution is skewed, such as skewness towards a direction of values. If the data of interest is non-normal, identifying anomalies based on the skewed data set could result in incorrectly identifying anomalous or non-anomalous data points. In some cases, a transformation is applied to the data set of interest to normalize the data set. For example, applying a Box-Cox transformation to the data set of interest provides a data set having a normal or approximately normal distribution. In some cases, the Box-Cox transformation is defined as:

$$T(Y) = (Y^\lambda - 1)/\lambda, \lambda \neq 0$$

$$T(Y) = \ln(Y), \lambda = 0 \quad \text{(Eq. 1)}$$

For Equation 1, Y is a response variable (e.g., the data set of interest) and $\lambda$ is a transformation parameter. The transformed data set T(Y) is calculated for a range of values for $\lambda$ (where $\lambda=0$, T(Y) is calculated as the natural log of Y). The normalized data set provided by the Box-Cox transformation is based on the value of $\lambda$ that provides a transformed data set having a distribution that most closely matches a normalized distribution, such as by computing a correlation of the transformed data set to a normal probability plot.

In an embodiment, a Box-Cox transformation is applied to the data set of interest for a range of values of $\lambda$. The transformed data set T(Y) is calculated for a range of values of $\lambda$ (e.g., between −5 and +5). A normalized data set based on the data set of interest is selected based on the value of $\lambda$ that provides T(Y) having a distribution that most closely matches a normalized distribution.

In some embodiments, a test for normalization is performed on a data set of interest, such as one or more of data set 502 or corrected data set 522. Additionally or alternatively, a Box-Cox transformation is applied to the data set of interest, such as one or more of data set 502 or corrected data set 522. Additionally or alternatively, a symmetry correction module, such as symmetry correction module 530, performs one or more of a test for normalization or a Box-Cox transformation on a data set.

Trend Removal

In some embodiments, the data set of interest is tested for the presence of one or more trends. For example, a data set having data points tending to change in a direction (e.g., upwards or downwards) has a trend present. If a trend is present in the data of interest, identifying anomalies based on the trended data could result in incorrectly identifying anomalous or non-anomalous data points. For example, with regards to FIG. 4, identifying anomalies based on data set 400 could incorrectly identify some of the data points as non-anomalous, such as data points 407 and 418. In some cases, a regression is calculated for the data set of interest, and a trendless data set is determined based on the regression.

In an embodiment, a data set of interest is tested for the presence of trends. For example, a Mann-Kendall test is run on the data set of interest. In some cases, the Mann-Kendall test evaluates a null hypothesis that the data set has no trend versus an alternative hypothesis that the data set follows a trend. The results of the null and alternative hypothesis evaluations indicate whether or not the data set has a trend present.

Additionally or alternatively, if the data set of interest is determined to have one or more trends, a trendless data set is determined based on the data set of interest. For example, a linear regression is run on the data set of interest. The linear regression produces a set of residuals based on the data points in the data set of interest, such as residuals indicating a deviation of each data point from the calculated mean of the data set. In some cases, a trendless data set is determined based on the produced set of residuals.

In some embodiments, a test for trends is performed on a data set of interest, such as one or more of data set 502, corrected data set 522, or normalized data set 532. Additionally or alternatively, a trendless data set is determined based on a linear regression run on the data set of interest, such as one or more of data set 502, corrected data set 522, or normalized data set 532. Additionally or alternatively, a trend removal module, such as trend removal module 540, performs one or more of a test for trends or a linear regression on a data set.

Estimation of Maximum Number of Anomalies

In some embodiments, a quantity of anomalies is estimated for the data set of interest. For example, a data set of interest is provided to an anomaly estimation module, such as estimation module 550. In some cases, the data set of interest is validated, as described elsewhere herein. For example, a validated data set is based on one or more of a time period correction, a normalization, or a trend removal applied to the data set of interest.

In an embodiment, a maximum number of anomalies is estimated for one or more of the data set of interest or the validated data set. For example, the estimated maximum is determined based on an adjusted box plot is applied to the data set. The box plot identifies one or more data points (e.g., data points falling outside the box interval) as potential anomalies in the data set.

Figure 9:
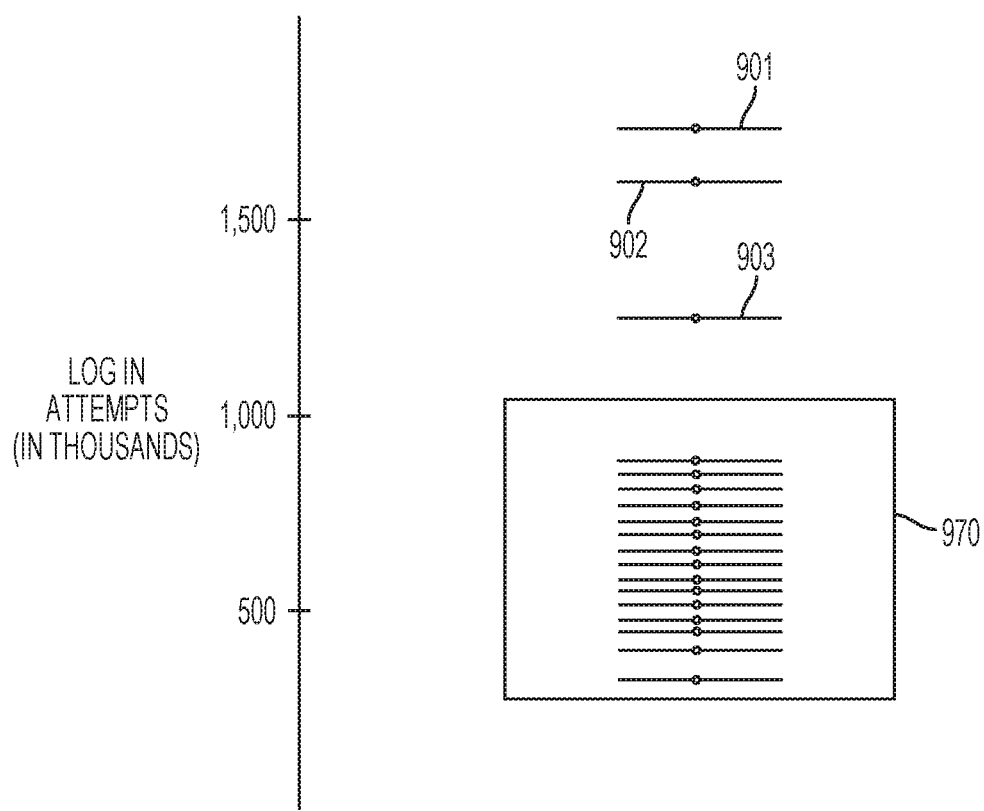
FIG. 9 is a diagram depicting an exemplary adjusted box plot applied to an example data set, according to certain embodiments.

FIG. 9 depicts a diagram of an adjusted box plot applied to an example data set, such as a data set representing a number of website login attempts over a range of times. Each point in the data set is represented on the adjusted box plot based on a value of the respective data point. For example, the data points are represented on the adjusted box plot as lines, based on the values of the data points (e.g., the number of login attempts). A box interval 970 is determined for the adjusted box plot based on quartiles determined for the population of data points. One non-limiting technique to determine the quartiles is described by M. Hubert & E. Vandervieren, "An Adjusted Boxplot For Skewed Distributions" (Computational Statistics & Data Analysis, Aug. 15, 2008, Volume 52, Issue 12), which is incorporated by reference herein in its entirety. However, other techniques are available.

In some embodiments, an estimated maximum number of anomalies is based on the number of data points that fall outside the box interval of the adjusted box plot. For example, in FIG. 9, the lines 901, 902, and 903 fall outside of the box interval 970. Based on the number of these lines 901, 902, and 903, the estimated maximum number of anomalies for the data set 900 is three.

In some embodiments, the estimated maximum number of anomalies is calculated based on a data set of interest, such as one or more of data set 502, corrected data set 522, or normalized data set 532. Additionally or alternatively, an anomaly estimation module, such as estimation module 550, applies an adjusted box plot to a data set.

Identification of Anomalies

In some embodiments, one or more anomalies are identified for the data set of interest. For example, the data set of interest is provided to an anomaly identification module, such as identification module 560. In some cases, the data set of interest is validated, as described elsewhere herein. For example, a validated data set is based on one or more of a time period correction, a normalization, or a trend removal applied to the data set of interest. Based on the data set and the estimated maximum, the identification module identifies one or more points as anomalies in the data set. A non-limiting example of a technique to identify the anomalies is the GESD test using the estimated maximum as an input. Other techniques are available, however.

In an embodiment, an anomaly is identified for one or more of the data set of interest or the validated data set. For example, an anomaly is identified based on the GESD test performed by an identification module. In some cases, the identification module receives an input indicating an estimated number of anomalies (also, "k"). The GESD test evaluates a null hypothesis that the data set has no anomalies versus an alternative hypothesis that the data set has up to the estimated number of anomalies (e.g., up to k anomalies). The results of the evaluation indicates a correct number of anomalies present in the data set.

In some cases, the GESD test includes one or more iterations based on the received input k (e.g., k iterations are performed). Additionally or alternatively, a second iteration is based upon a result of a first evaluation. For example, a GESD test is performed on an example data set having ten data points, a sample mean, and a sample standard deviation. A first iteration of the GESD compares each data point value to the sample mean. Based on the comparison of each of the ten data points to the sample mean (e.g., based on subtracting the mean from the point value), a particular data point having the largest difference from the sample mean is identified. A second iteration of the GESD compares each data point value except for the identified point to the sample mean. Based on the comparison of each of the remaining nine data points to the sample mean, another particular data point having the next largest difference from the sample mean is identified. In some cases, fewer iterations of the GESD test are performed based on providing the identification module with an input k having a smaller value. Additionally or alternatively, more iterations of the GESD test are performed based on providing the identification module with an input k having a larger value.

In some cases, each of the k iterations generates a test statistic (also, "$R_i$") and a critical value (also, "$\lambda_i$") for the particular iteration (e.g., the ith iteration). Additionally or alternatively, each critical value $\lambda_i$ is generated based on a significance level (e.g., a significance level of 5%). In an embodiment, the anomalies in the data set are identified based on a comparison of each test statistic $R_i$ to each respective critical value $\lambda_i$. Additionally or alternatively, the anomalies in the data set are identified based on the largest i for which $R_i$ is greater than $\lambda_i$. For example, if a third iteration of the GESD test generates an $R_3$ and a $\lambda_3$, such that the value of $R_3$ is greater than the value of $\lambda_3$, and no larger values of i (e.g., $R_4$, $R_5$, etc.) also have $R_i$ is greater than $\lambda_i$, the GESD test determines that the data set has three anomalies present.

In an embodiment, a data set, such as modified data set 504, is estimated to have a maximum number of anomalies, such as anomaly estimate 552. The data set and the estimated maximum are provided to an identification module, such as anomaly identification module 550, that is capable of performing a GESD test based on the provided data set and estimated maximum. The data set has a small number of data points (e.g., 10-20 points), a sample mean, and a sample standard deviation. In some cases, the estimated maximum is provided to the identification module as an input k, such that the value of k is the value of the estimated maximum.

In some embodiments, the identification module performs k iterations of the GESD test. The identification module generates an $R_i$ test statistic, generates a $\lambda_i$ critical value, and identifies a particular data point having the largest difference from the sample mean is identified for each of the k iterations. For example, if the data set is estimated to have a maximum of three anomalies, the identification module performs three iterations of the GESD test. Based on the first iteration, the identification module generates $R_1$ and $\lambda_1$, and identifies a first data point having the largest difference from the sample mean. Based on the second iteration, the identification module generates $R_2$ and $\lambda_2$, and identifies a second data point having the second largest difference from the sample mean. Based on the third iteration, the identification module generates $R_3$ and $\lambda_3$, and identifies a third data point having the third largest difference from the sample mean.

In some embodiments, the identification module identifies the anomalies in the data set based on a comparison of each test statistic $R_i$ to each respective critical value $\lambda_i$. For example, the identification module compares $R_1$ with $\lambda_1$, $R_2$ with $\lambda_2$, and $R_3$ with $\lambda_3$. Based on the respective comparisons, the value of $R_1$ is less than or equal to the value of $\lambda_1$. Additionally or alternatively, the value of $R_2$ is greater than the value of $\lambda_2$. Additionally or alternatively, the value of $R_3$ is less than or equal to the value of $\lambda_3$. In some embodiments, the identification module identifies the anomalies in the data set based on the determination that a particular test statistic $R_i$ has a value greater than a respective critical value $\lambda_i$. For example, based on determining that the value of $R_2$ is greater than the value of $\lambda_2$, the identification module identifies that the data set has two anomalies. Additionally or alternatively, the identification module identifies that the two anomalies include the first data point having the largest difference from the sample mean, and the second data point having the second largest difference from the sample mean. In some embodiments, the determined anomalies, the number of determined anomalies, or both, are provided to a user interface, such as user interface 580.

Determining Confidence Intervals

In some embodiments, one or more confidence intervals are determined for each identified anomaly in a data set. For example, an anomaly identification module, such as identification module 560, determines a confidence interval for an anomalous point. In some cases, a confidence interval is determined based on a critical value generated by a GESD test, such as a critical value $\lambda_i$. Other techniques are available, however.

In an embodiment, an anomaly in a data set is identified based on a GESD test performed by an anomaly identification module. In some cases, the identification module generates a test statistic (also, "$R_i$") and a critical value (also, "$\lambda_i$") associated with the identified anomaly. Additionally or alternatively, the critical value $\lambda_i$ is generated based on a significance level, such as a significance level included in the GESD test.

In some cases, the significance level is based on an indicated confidence level, such as confidence level 509. For example, based on an indicated confidence level of 0.99 (e.g., 99%), a significance level in the GESD test is 0.01 (e.g., 1%). Additionally or alternatively, the significance level is based on a default value, such as a default significance level of 0.05 (e.g., 5%). In some cases, a number of anomalies identified is based in part on the confidence level. For example, a confidence level of 95% results in more data points identified as anomalous, while a confidence level of 99% results in fewer data points identified as anomalous. In some cases, a user who wishes to receive more indications of anomalies provides a confidence level having a relatively lower level (e.g., about 90% to about 95%). Additionally or alternatively, a user who wishes to receive fewer indications of anomalies provides a confidence level having a relatively higher level (e.g., about 95% to about 99%).

In some embodiments, a confidence interval is determined by the anomaly identification module based on the critical value $\lambda_i$ corresponding to the iteration by which the anomaly was identified. In some cases, the confidence interval is determined by Equation 2, defined as:

$$m_i - |\lambda_i(\sigma_i)|, m_i + |\lambda_i(\sigma_i)| \qquad (Eq.\ 2)$$

For Equation 2, $m_i$ is the mean and $\sigma_i$ is the standard deviation of the data set, after i anomalies are removed from the data set. The operator |•| indicates an absolute value. The confidence interval for an anomaly identified by the iteration i has a lower bound of $m_i - |\lambda_i(\sigma_i)|$ and an upper bound of $m_i + |\lambda_i(\sigma_i)|$.

For example, the identification module identifies that the data set has two anomalies based on determining that the value of $R_2$ is greater than the value of $\lambda_2$, as described elsewhere herein. A confidence interval for the anomaly identified by i=1 has a lower bound of $m_1 - |\lambda_1(\sigma_1)|$ and an upper bound of $m_1 + |\lambda_1(\sigma_1)|$. A confidence interval for the anomaly identified by i=2 has a lower bound of $m_2 - |\lambda_2(\sigma_2)|$ and an upper bound of $m_2 |\lambda_2(\sigma_2)|$. In some cases, the identification module determines that a data set has no anomalous data points. In such cases, the identified confidence interval is based on the critical value of the first iteration of the GESD test performed by the identification module.

Figure 10:
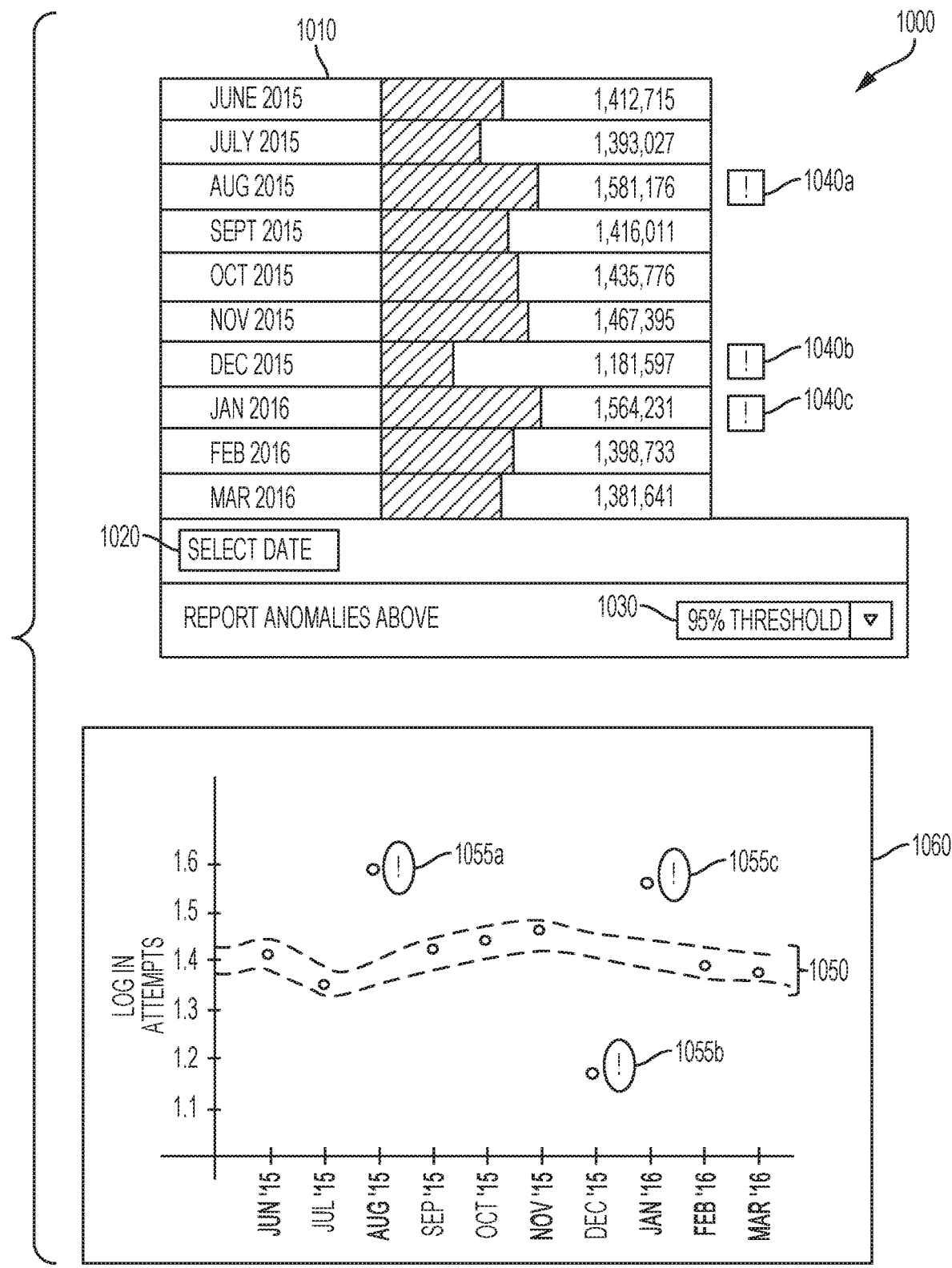
FIG. 10 is a diagram depicting an exemplary user interface capable of receiving and providing information related to identifying anomalies, according to certain embodiments.

FIG. 10 depicts an example of a user interface 1000 that is capable of receiving and providing information related to identifying anomalies. In some embodiments, the user interface 1000 is capable of receiving one or more of an indication of a data set of interest (e.g., login attempts for a website) or an indication of a confidence level. For example, the user interface 1000 receives indications via interface elements (e.g., buttons, text boxes, menus). Additionally or alternatively, the user interface 1000 is capable of displaying representations of one or more of the data set, identified anomalies, and confidence intervals associated with the anomalies.

In some embodiments, the user interface 1000 includes a display area 1010 that is capable of displaying representations of data points included in the data set. For example, the display area 1010 displays one or more rows, each row including at least one value (e.g., a date, a number of login attempts) associated with a data point. Additionally or alternatively, the user interface 1000 includes an interface element 1020 by which a user indicates the data set. Additionally or alternatively, the user interface 1000 includes an interface element 1030 by which a user indicates a confidence level.

In some embodiments, the user interface 1000 displays one or more anomaly indicators, such as indicators 1040a, 1040b, and 1040c (collectively, "1040"). For example, the indicators 1040 are displayed near data points that are identified as anomalous.

Additionally or alternatively, the user interface 1000 displays one or more confidence intervals, such as confidence interval 1050, associated with the identified anomalies. For example, the user interface 1000 includes a chart area 1060 that is capable of displaying plotted representations of data points. Additionally or alternatively, the chart area 1060 is capable of displaying indicators 1055a, 1055b, and 1055c (collectively, "1055"), indicating the data points that fall outside of the confidence interval 1050.

Figure 11:
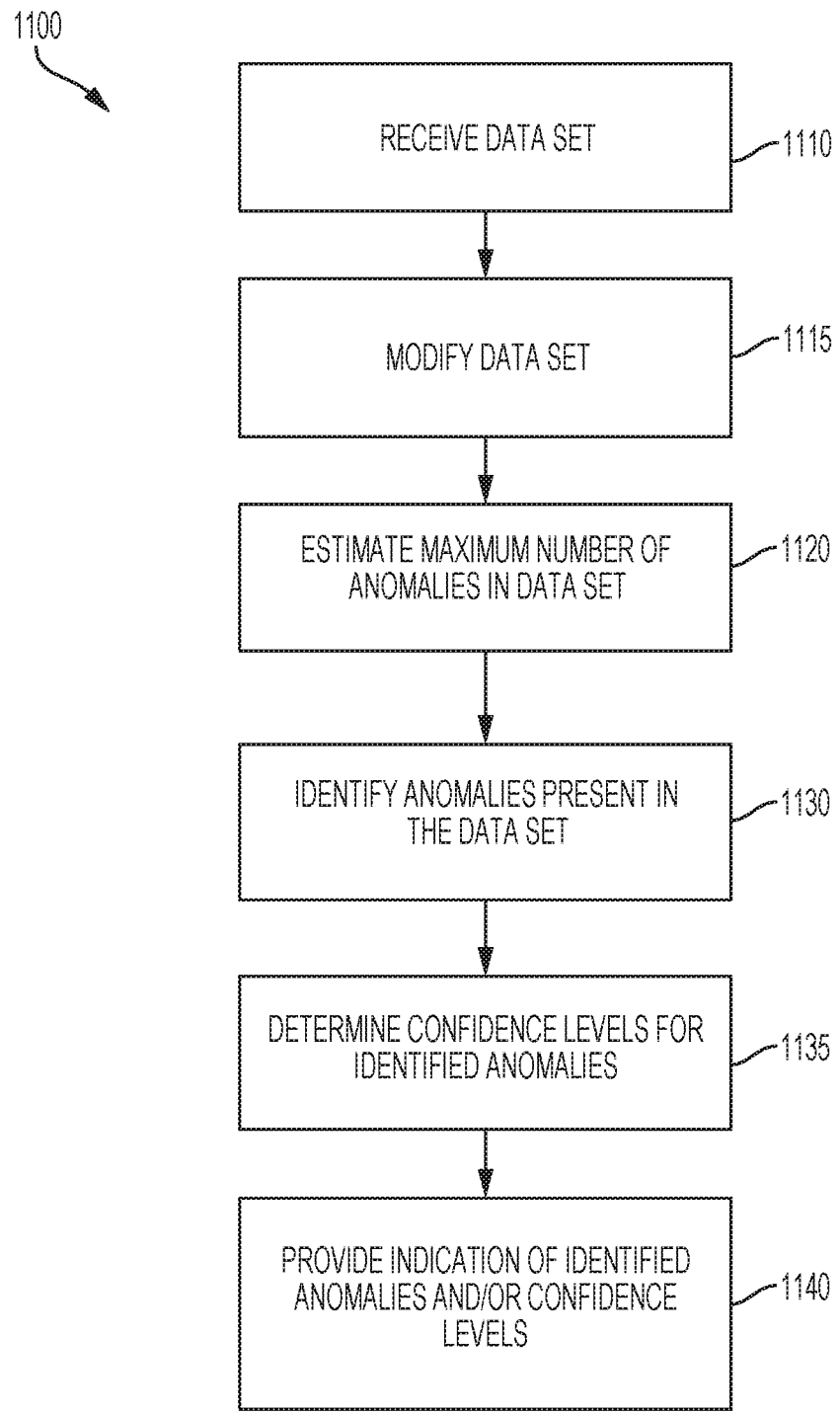
FIG. 11 is a flow chart depicting an exemplary process for identifying anomalies in a data set, according to certain embodiments.

FIG. 11 is a flow chart depicting an example of a process 1100 for identifying one or more anomalies in a data set. In some embodiments, such as described in regards to FIGS. 1-10, a computing device executing an anomaly identification system implements operations described in FIG. 11, by executing suitable program code. For illustrative purposes, the process 1100 is described with reference to the examples depicted in FIGS. 1-10. Other implementations, however, are possible.

At block 1110, the process 1100 involves receiving a data set of interest. In some cases, the data set of interest is small, including a relatively small number of data points. In some embodiments, the data set is received by anomaly identification system 510, as described in regards to FIG. 5. Additionally or alternatively, the data set is received based on an indication provided via a user interface, such as user interface 580. The data set is received via a user interface, or from a data source such as data source 590, or both.

At block 1115, the process 1100 involves modifying the received data set. In some cases, modifying the data set includes determining that the received data set is in a form that is suitable for anomaly detection. Additionally or alternatively, based on determining that the received data set is not suitable for anomaly detection, modifying the data set includes performing one or more validation techniques. For example, techniques for time period correction are applied to the data set, such as by period correction module 520, as described in regards to FIG. 5. Additionally or alternatively, techniques for normalization are applied to the data set, such as by symmetry correction module 530. Additionally or alternatively, techniques for trend removal are applied to the data set, such as by trend removal module 540. In some embodiments, operations related to block 1115 are omitted. For example, if the received data set has a normal distribution, requires no time period correction, and includes no trends, techniques related to validating the data are omitted.

At block 1120, the process 1100 involves estimating a maximum number of anomalies in one or more of the received data set or the modified data set. In some embodiments, the estimated maximum is determined by an anomaly estimation module, such as estimation module 550, as described in regards to FIG. 5. In some cases, the estimated maximum is determined based on applying an adjusted box plot to the data set, but other estimation techniques are available.

At block 1130, the process 1100 involves identifying one or more anomalies present in the data set. In some embodiments, the anomalies are identified by an anomaly identification module, such as identification module 560, as described in regards to FIG. 5. In some cases, the anomalies are identified based on performing a GESD test on the data set, but other identification techniques are available. Additionally or alternatively, the GESD test is based on one or more received inputs. For example, an estimated maximum number of anomalies is provided, such as from operations regarding block 1120, and a number of iterations of the GESD test is based on the estimated maximum. Additionally or alternatively, a confidence level is provided, such as from a user interface, and a significance level of the GESD test is based on the confidence level.

At block 1135, the process 1100 involves determining one or more confidence intervals corresponding to the identified anomalies. In some embodiments, the confidence intervals are determined by an anomaly identification module, such as identification module 560. For example, confidence intervals are determined based on critical values generated during a GESD test. In some cases, the confidence intervals are generated based on a confidence level, such as a confidence level provided by a user interface. Additionally or alternatively, the confidence intervals are generated based on a default value, such as a default significance level of the GESD test. In some embodiments, operations related to block 1135 are omitted. For example, if no confidence level is provided by a user, confidence intervals are not generated.

At block 1140, the process 1100 involves providing one or more indications of the identified anomalies, the corresponding confidence intervals, or both. In some embodiments, the indications are provided to a user interface, such as user interface 580, as described in regards to FIG. 5. Additionally or alternatively, the indications are provided to a data storage device, such as data source 590.

Figure 12:
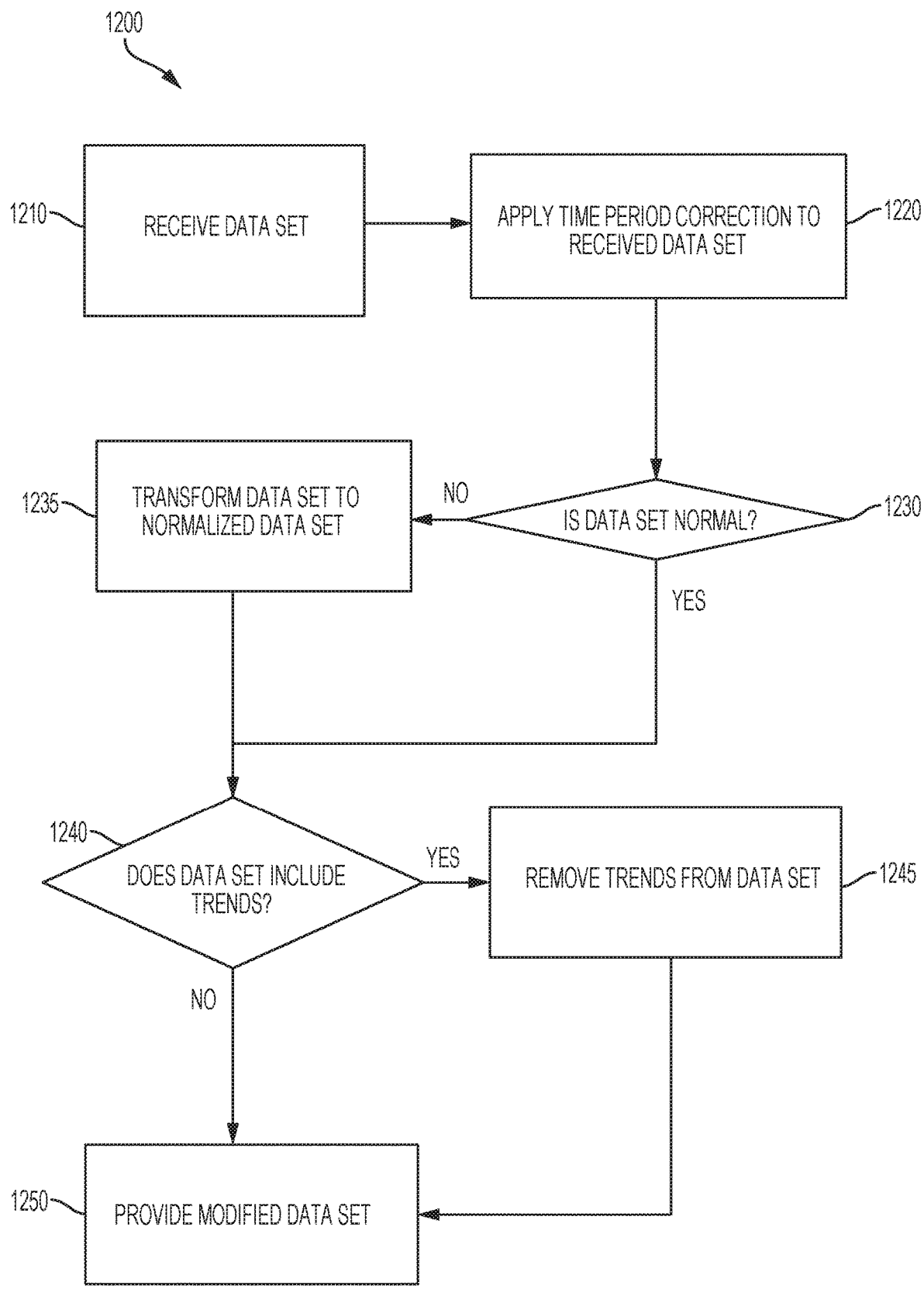
FIG. 12 is a flow chart depicting an exemplary process for modifying a data set, according to certain embodiments.

FIG. 12 is a flow chart depicting an example of a process 1200 for modifying a data set, such as to validate the data set for anomaly identification. In some embodiments, such as described in regards to FIGS. 1-11, a computing device executing an anomaly identification system implements operations described in FIG. 12, by executing suitable program code. Additionally or alternatively, one or more operations described in FIG. 12 are implemented by additional computing devices, such as a computing device that communicates with an anomaly identification system via a network. For illustrative purposes, the process 1200 is described with reference to the examples depicted in FIGS. 1-11. Other implementations, however, are possible.

At block 1210, the process 1200 involves receiving a data set of interest. For example, a data set is received as described in regards to block 1110 of FIG. 11. In some cases, the data set is received from an anomaly identification system, such as via a network.

At block 1220, the process 1200 involves applying a time period correction to the data set, as described elsewhere herein. For example, a user indicates via a user interface, such as user interface 580 described in regards to FIG. 5, that a year-over-year correction is applied to the data set. In some embodiments, additional data related to a different time period is accessed. Additionally or alternatively, values included in the additional data are subtracted from value included in the data set of interest. In some embodiments, operations related to block 1220 are performed by a time period correction module 520, as described in regards to FIG. 5.

At block 1230, the process 1200 involves determining whether a distribution of the data set is normal. In some cases, the data set is tested to determine normality of the distribution, as described elsewhere herein. If the data set is non-normal, process 1200 proceeds operations related to block 1235. If the data set is normal, process 1200 proceeds to additional operations, such as operations related to block 1240.

At block 1235, the process 1200 involves normalizing the distribution of the data set. In some embodiments, a Box-Cox transformation is applied to the data set, as described elsewhere herein. In some embodiments, operations related to one or more of blocks 1230 or 1235 are performed by a symmetry correction module 530, as described in regards to FIG. 5.

At block 1240, the process 1200 involves determining whether the data set includes a trend. In some cases, the data set is tested to determine whether one or more trends are present, as described elsewhere herein. For example, a Mann-Kendall test is performed to determine if a trend is present. If the data set includes a trend, process 1200 proceeds operations related to block 1245. If the data set is trendless, process 1200 proceeds to additional operations, such as operations related to block 1250.

At block 1245, the process 1200 involves removing trends from the data set. In some embodiments, a linear regression is applied to the data set and a modified data set is produced based on the linear regression, as described elsewhere herein. In some embodiments, operations related to one or more of blocks 1240 or 1245 are performed by a trend removal module 540, as described in regards to FIG. 5.

At block 1250, the process 1200 involves providing a modified data set, such as modified data set 504, as described in regards to FIG. 5. In some embodiments, the modified data set is provided to an anomaly estimation module, such as anomaly estimation module 550. Additionally or alternatively, the modified data set is provided to an anomaly identification module, such as anomaly identification module 560. In some cases, the modified data set is based on a portion of the operations described in regards to process 1200. For example, if the received data set requires no time period correction, has a normal distribution, and is trendless, operations related to one or more of blocks 1220, 1235, and 1245 are omitted. In such cases, the provided modified data set includes values that are included in the received data set.

Figure 13:
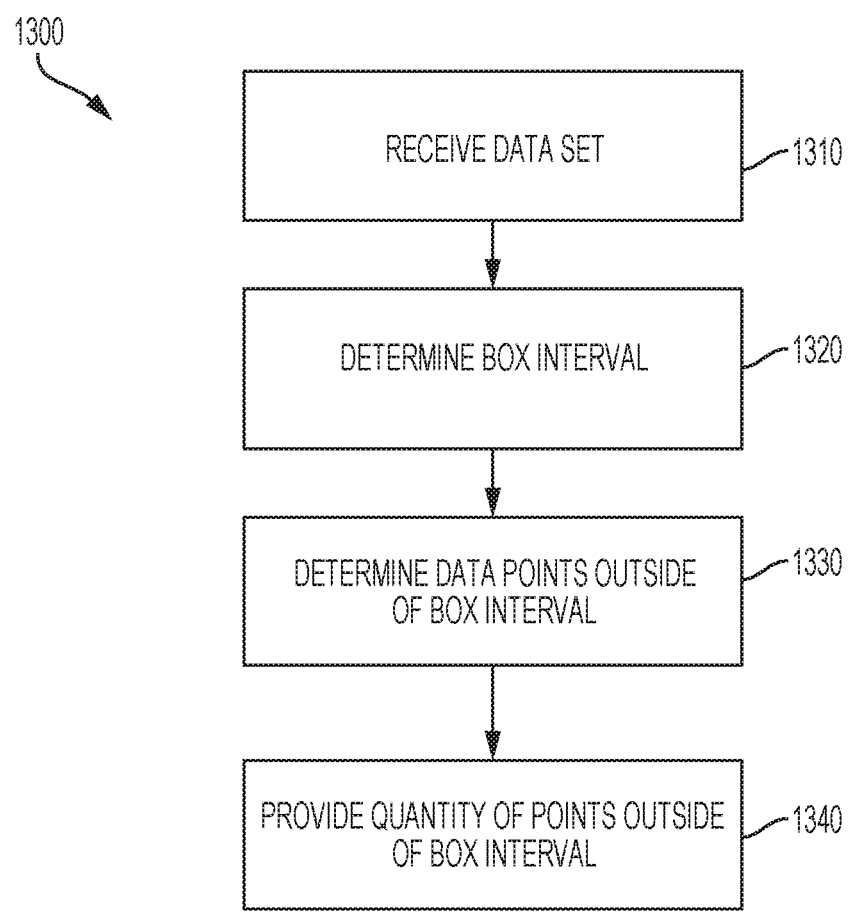
FIG. 13 is a flow chart depicting an exemplary process for estimating a maximum number of anomalies in a data set, according to certain embodiments.

FIG. 13 is a flow chart depicting an example of a process 1300 for estimating a maximum number of anomalies in a data set. The process 1300 includes operations for estimating a maximum by applying an adjusted box plot to a data set, but other estimation techniques are available. In some embodiments, such as described in regards to FIGS. 1-12, a computing device executing an anomaly identification system implements operations described in FIG. 13, by executing suitable program code. Additionally or alternatively, one or more operations described in FIG. 13 are implemented by additional computing devices, such as a computing device that communicates with an anomaly identification system via a network. For illustrative purposes, the process 1300 is described with reference to the examples depicted in FIGS. 1-12. Other implementations, however, are possible.

At block 1310, the process 1300 involves receiving a data set of interest. In some embodiments, the data set is received by anomaly estimation module 550, as described in regards to FIG. 5. Additionally or alternatively, the received data set is a modified data set, such as described in regards to FIG. 12. In some cases, the data set is received from an anomaly identification system, such as via a network.

At block 1320, the process 1300 involves determining a box interval for the data set. In some cases, the box interval is determined based on the values of data points included in the data set. For example, quartiles are determined based on the data point values, and the box interval is based on the quartiles. In some embodiments, the box interval is applied to the data points.

At block 1330, the process 1300 involves determining data points that are outside of the box interval. For example, a data point with a value greater than an upper bound of the box interval is determined to be outside of the box interval. Additionally or alternatively, a data point with a value lesser than a lower bound of the box interval is determined to be outside of the box interval. In some embodiments, the quantity of data points falling outside the box interval is determined.

At block 1340, the process 1300 involves providing the quantity of data points outside the box interval. In some cases, the quantity is provided as an estimate of the maximum number of anomalies in the data set, such as anomaly estimate 552 described in regards to FIG. 5. For example, the estimate is provided to an anomaly identification module as an input for a GESD test, as described elsewhere herein.

Figure 14:
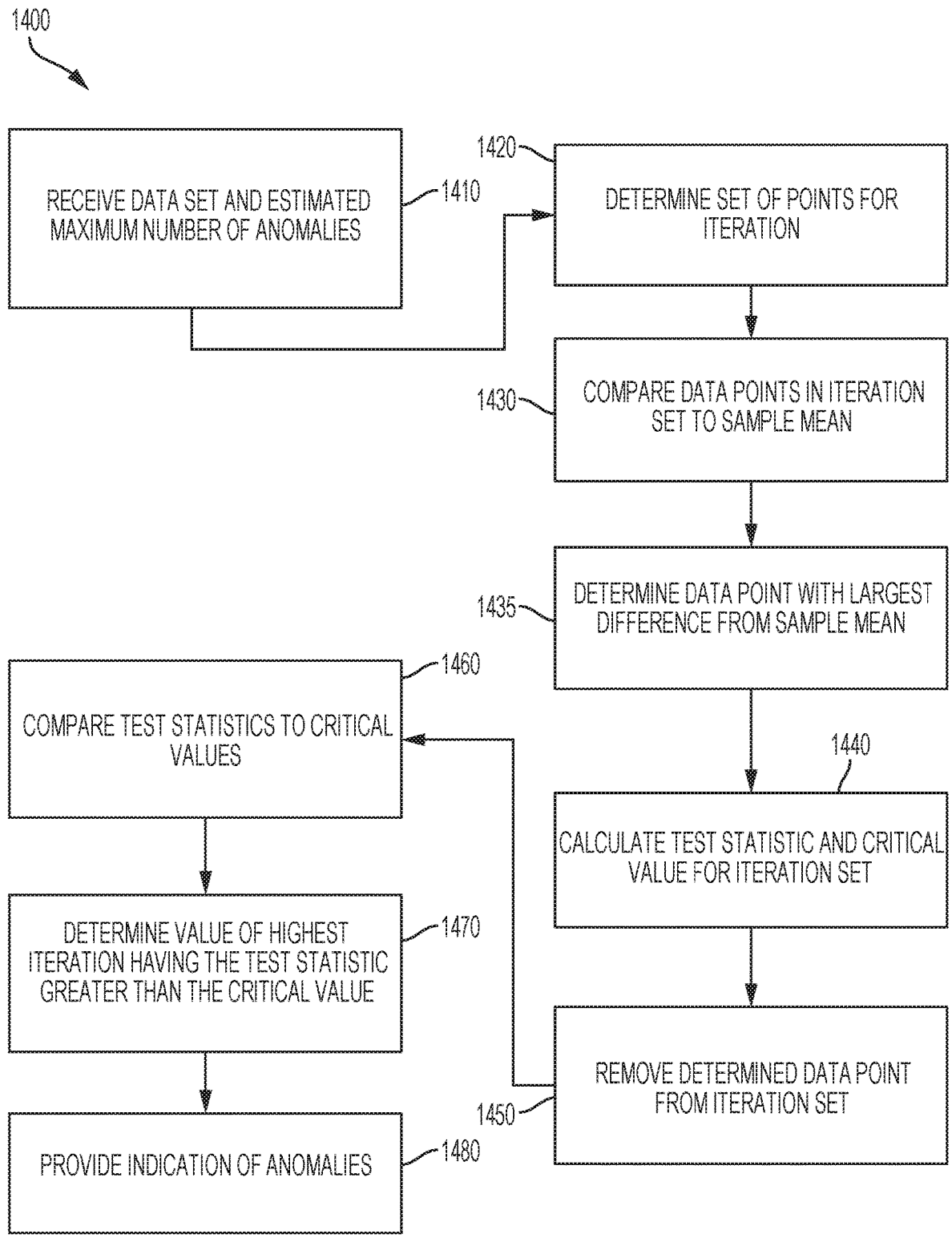
FIG. 14 is a flow chart depicting an exemplary process for identifying anomalies in a data set, according to certain embodiments.

FIG. 14 is a flow chart depicting an example of a process 1400 for identifying anomalies in a data set. The process 1400 includes operations for identifying anomalies by performing a GESD test on a data set, but other identification techniques are available. In some embodiments, such as described in regards to FIGS. 1-13, a computing device executing an anomaly identification system implements operations described in FIG. 14, by executing suitable program code. For illustrative purposes, the process 1400 is described with reference to the examples depicted in FIGS. 1-13. Other implementations, however, are possible.

At block 1410, the process 1400 involves receiving a data set, an estimated maximum number of anomalies in the data set, or both. In some embodiments, the data set is received by anomaly identification module 560, as described in regards to FIG. 5. Additionally or alternatively, the received data set is a modified data set, such as described in regards to FIG. 12. In some embodiments, the estimated maximum is received from anomaly estimation module 550. A number of iterations of the GESD test is determined based on the estimated maximum. Additionally or alternatively, a confidence level is also received, such as via a user interface 580. A significance level of the GESD test is based on the confidence level.

At block 1420, the process 1400 involves determining a set of points for an iteration (e.g., iteration number i) of the GESD test. For example, for an initial iteration (e.g., i=1), the iteration set includes all data points in the received data set. For additional iterations (e.g., i>1), the iteration set includes fewer than all of the data points in the received data set. In some cases, data points that are omitted from the iteration set are determined based on results of a previous iteration. For example, for a subsequent iteration (e.g., i=2), the iteration set omits a data point identified by a previous iteration (e.g., i=1).

At block 1430, the process 1400 involves comparing the value of each point in the iteration set is compared to the sample mean of the received data set. At block 1435, the process 1400 involves identifying the particular data point having the largest difference from the sample mean. For example, a particular data point $x_i$ is identified based on determining that the absolute value of the difference between $x_i$ and the sample mean is larger than the difference of any other data point in the iteration set.

At block 1440, the process 1400 involves calculating one or more of a test statistic and a critical value for the iteration set. In some embodiments, test statistic $R_i$ is calculated based on a value of the identified data point $x_i$. Additionally or alternatively, critical value $\lambda_i$ is calculated based on a significance level. In some cases, the significance level is based on the received confidence level, as described in regards to block 1410. Additionally or alternatively, the significance level is based on a default value (e.g., a default significance level of 0.05).

At block 1450, process 1400 involves removing the identified point $x_i$ from the iteration set. For example, the identified point $x_i$ is not included in a set of points for a subsequent iteration, as described in regards to block 1420. In some cases, removing the identified point includes deleting the data point associated with point $x_i$. Additionally or alternatively, removing the identified point includes setting an indication (e.g., a programming flag) that the identified point is omitted from subsequent iteration sets.

In some embodiments, operations related to one or more of blocks 1420, 1430, 1435, 1440, and 1450 are repeated. For example, operations are repeated for each iteration, where the number of iterations is determined based on the estimated maximum, as described with regards to block 1410. For an example process 1400 receiving an estimated maximum of 3, operations are repeated such that three iterations of the GESD test are performed, data points $x_1$, $x_2$, and $x_3$ are identified, test statistics $R_1$, $R_2$, and $R_3$ are calculated, and critical values $\lambda_1$, $\lambda_2$, and $\lambda_3$ are calculated.

At block 1460, process 1400 involves comparing the test statistics to the critical values. In some embodiments, each test statistic is compared to the respective critical value for the interval, and a determination is made whether the test statistic is greater than the critical value. For example, $R_1$ is compared to $\lambda_1$, $R_2$ is compared to $\lambda_2$, and $R_3$ is compared to $\lambda_3$, and a determination is made that $R_1$ is greater than $\lambda_1$, and $R_2$ is greater than $\lambda_2$. In some cases, if the test statistic is determined to be greater than the critical value, the iteration associated with the test statistic and the critical value is determined. For example, the iteration with value i=1 is determined for $R_1$ and $\lambda_1$, and the iteration with value i=2 is determined for $R_2$ and $\lambda_2$.

At block 1470, process 1400 involves determining a particular iteration having the highest value, such that the test statistic for that iteration is greater than the respective critical value. For example, $R_1$ is greater than $\lambda_1$, and $R_2$ is greater than $\lambda_2$, as described in regards to block 1460. A determination is made that the iteration with value i=2 is the iteration having the highest value, such that the test statistic is greater than the critical value.

At block 1480, process 1400 involves providing an indication of the identified anomalies. In some embodiments, the number of identified anomalies is the value of the particular iteration identified in regards to block 1470. For example, based on determining that the iteration with value i=2 is the highest-value iteration having the test statistic greater than the critical value, two identified anomalies are provided. In some cases, the anomalous data points are provided to a user interface, such as user interface 580 described in regards to FIG. 5. Additionally or alternatively, the anomalous data points are provided to a storage device, such as data source 590.

Figure 15:
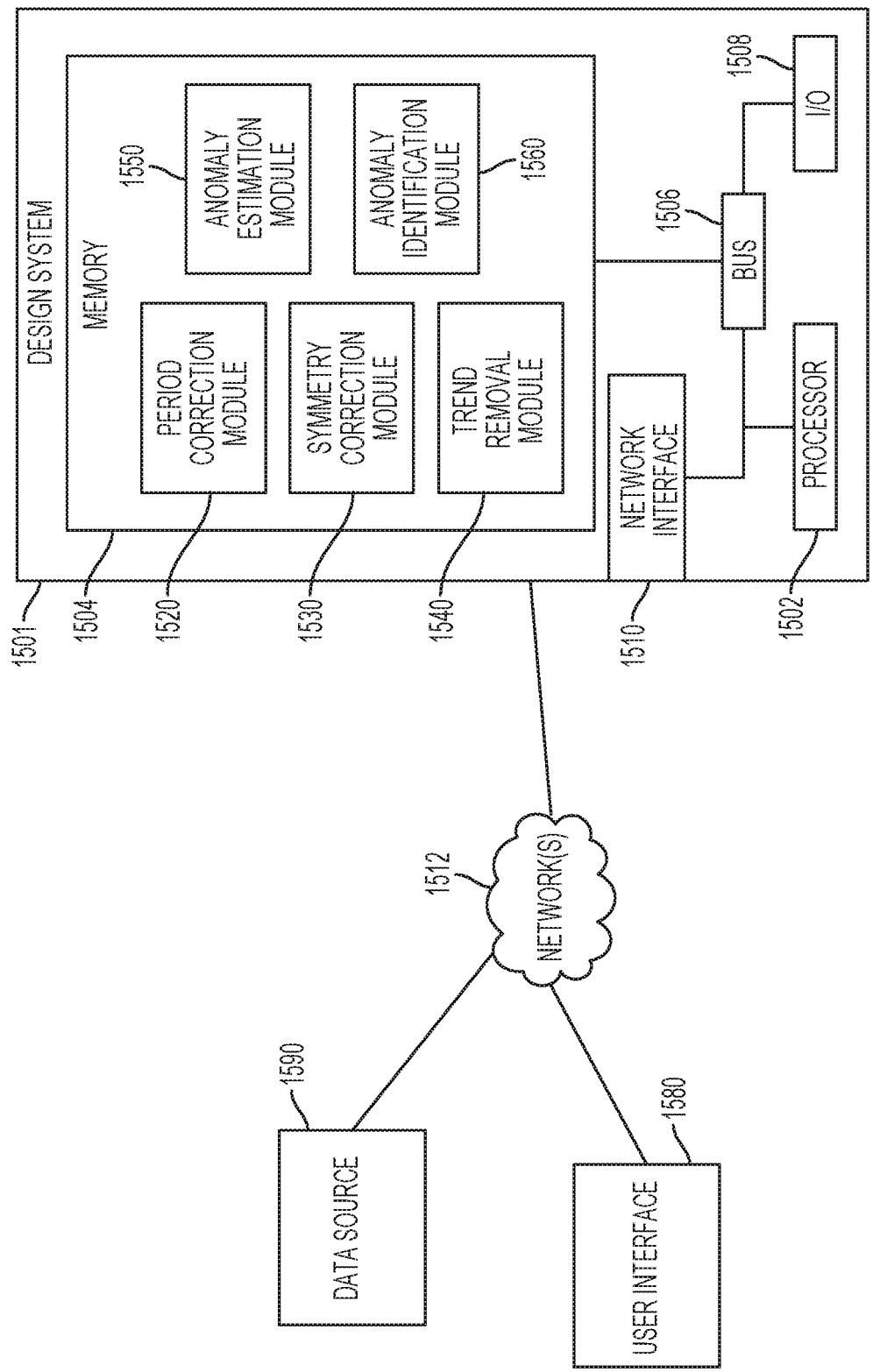
FIG. 15 is a block diagram depicting an exemplary implementation of a computing system for identifying anomalies in data sets, according to certain embodiments.

Any suitable computing system or group of computing systems can be used for performing the operations described herein. For example, FIG. 15 is a block diagram depicting an example implementation of a computing system 1501 for identifying anomalies in data sets, according to certain embodiments.

The depicted example of a computing system 1501 includes one or more processors 1502 communicatively coupled to one or more memory devices 1504. The processor 1502 executes computer-executable program code or accesses information stored in the memory device 1504. Examples of processor 1502 include a microprocessor, an application-specific integrated circuit ("ASIC"), a field-programmable gate array ("FPGA"), or other suitable processing device. The processor 1502 can include any number of processing devices, including one.

The memory device 1504 includes any suitable non-transitory computer-readable medium for storing one or more of the anomaly identification module 1560, anomaly estimation module 1550, the time period correction module 1520, the symmetry correction module 1530, the trend removal module 1540, and other received or determined data. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions include processor-specific instructions generated by a compiler or an interpreter from code written in any suitable computer-programming language, including, for example, C, C++, C#, Visual Basic, Java, Python, Perl, JavaScript, and ActionScript.

The computing system 1501 also includes a number of external or internal devices such as input or output devices. For example, the computing system 1501 is shown with an input/output ("I/O") interface 1508 that can receive input from input devices or provide output to output devices. A bus 1506 can also be included in the computing system 1501. The bus 1506 communicatively couples one or more components of the computing system 1501.

The computing system 1501 executes program code that configures the processor 1502 to perform one or more of the operations described above with respect to FIGS. 1-14. The program code includes operations related to, for example, one or more of an anomaly estimation module 1550, the anomaly identification module 1560, user interface 1580, data source 1590, or other suitable applications or memory structures that perform one or more operations described herein. The program code is resident in the memory device 1504 or any suitable computer-readable medium and is executed by the processor 1502 or any other suitable processor. In some embodiments, the program code described above and additional modules time period correction module 1520, the symmetry correction module 1530, and the trend removal module 1540 are stored in the memory device 1504, as depicted in FIG. 15. In additional or alternative embodiments (not depicted in FIG. 15), the program code or other components is stored elsewhere. For example, in some embodiments, period correction module 1520, symmetry correction module 1530, and trend removal module 1540 are stored on one or more additional systems (not depicted in FIG. 15). In additional or alternative embodiments, one or more of the described modules 1520, 1530, 1540, 1550, and 1560, user interface 1580, data source 1590, and the program code described above are stored in one or more memory devices accessible via a data network, such as a memory device accessible via a cloud service.

The computing system 1501 depicted in FIG. 15 also includes at least one network interface 1509. The network interface 1509 includes any device or group of devices suitable for establishing a wired or wireless data connection to one or more data networks 1512. Non-limiting examples of the network interface 1509 include a wireless communications device, an Ethernet network adapter, a modem, and/or the like. The computing system 1501 is able to communicate with one or more of the user interface 1520, and the database 1590 using the network interface 1509.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of determining a number of anomalies present in a data set, the method comprising steps performed by at least one processor included in an anomaly identification system, the steps comprising:
   receiving, via a user interface, a data set comprising a set of values related to a metric;
   estimating, by an anomaly estimation module included in the anomaly identification system, a maximum number of potential anomalies present in the data set, wherein the maximum number of potential anomalies is estimated based on a quantity of data points outside of an adjusted box plot applied to the data set;
   performing, by an anomaly identification module included in the anomaly identification system, a set of comparisons based on the set of values, wherein a quantity of comparisons is based on the estimated maximum number of potential anomalies;
   determining, by the anomaly identification module and based on the performed set of comparisons, that one or more anomalies are present in the data set; and
   providing, via a display device, an indication of the one or more determined anomalies.

2. The method of claim 1, wherein the received data set corresponds to a first period of time, and the steps further comprise:
   receiving a second data set comprising a second set of values related to the metric wherein the second set of values corresponds to a second period of time occurring prior to the first period of time; and
   determining a modified data set comprising a modified set of values by subtracting the second data set from the data set,
   wherein estimating the maximum number of potential anomalies present is based on the modified data set, performing the set of comparisons is based on the modified set of values, and determining whether one or more anomalies are present is based on the modified data set.

3. The method of claim 1, wherein the steps further comprise:
   determining that the data set is skewed; and
   responsive to determining that the data set is skewed, determining a modified data comprising a modified set of values set by transforming the data set,
   wherein estimating the maximum number of potential anomalies present is based on the modified data set, performing the set of comparisons is based on the modified set of values, and determining whether one or more anomalies are present is based on the modified data set.

4. The method of claim 3, wherein transforming the data set comprises applying a Box-Cox transformation to the data set.

5. The method of claim 1, wherein the steps further comprise:
   determining that the data set has a trend component; and
   responsive to determining that the data set has a trend component, determining a modified data set comprising a modified set of values by removing the trend component from the data set,
   wherein estimating the maximum number of potential anomalies present is based on the modified data set, performing the set of comparisons is based on the modified set of values, and determining whether one or more anomalies are present is based on the modified data set.

6. The method of claim 5, wherein:
   determining that the data set has a trend component comprises applying a Mann-Kendall test to the data set; and
   removing the trend component from the data set comprises performing a linear regression on the data set.

7. The method of claim 1, wherein the steps further comprise:
   receiving, via the user interface, a confidence level, the confidence level identifying a desired sensitivity indicating a tolerance for incorrectly identified anomalies; and
   providing a confidence interval for each of the one or more determined anomalies, wherein each confidence interval is based on the received confidence level, and each confidence interval indicates a probability that the determined anomaly is incorrectly identified.

8. The method of claim 1, wherein determining whether the one or more anomalies are present in the data set is based on a generalized extreme standardized deviate test (GESD test).

9. The method of claim 1, wherein a number of values comprising the data set is less than 50.

10. A non-transitory computer-readable medium embodying program code for determining a number of anomalies present in a data set, the program code comprising instructions which, when executed by at least one processor included in an anomaly identification system, cause the processor to perform operations comprising:
   receiving, via a user interface, a data set, the data set comprising a set of values related to a metric;
   estimating, by an anomaly estimation module included in the anomaly identification system, a maximum number of potential anomalies present in the data set, wherein the maximum number of potential anomalies is estimated based on a quantity of data points outside of an adjusted box plot applied to the data set;
   performing, by an anomaly identification module included in the anomaly identification system, a set of comparisons based on the set of values, wherein a quantity of comparisons is based on the estimated maximum number of potential anomalies;
   determining, by the anomaly identification module and based on the performed set of comparisons, that one or more anomalies are present in the data set; and providing, via a display device, an indication of the one or more determined anomalies.

11. The non-transitory computer-readable medium of claim 10, wherein the received data set corresponds to a first period of time, and the operations further comprise:
receiving a second data set comprising a second set of values related to the metric wherein the second set of values corresponds to a second period of time occurring prior to the first period of time; and
determining a modified data set comprising a modified set of values by subtracting the second data set from the data set,
wherein estimating the maximum number of potential anomalies present is based on the modified data set, performing the set of comparisons is based on the modified set of values, and determining whether one or more anomalies are present is based on the modified data set.

12. The non-transitory computer-readable medium of claim 10, wherein the operations further comprise:
determining that the data set is skewed; and
responsive to determining that the data set is skewed, determining a modified data set comprising a modified set of values by transforming the data set,
wherein estimating the maximum number of potential anomalies present is based on the modified data set, performing the set of comparisons is based on the modified set of values, and determining whether one or more anomalies are present is based on the modified data set.

13. The non-transitory computer-readable medium of claim 10, wherein the operations further comprise:
determining that the data set has a trend component; and
responsive to determining that the data set has a trend component, determining a modified data set comprising a modified set of values by removing the trend component from the data set,
wherein estimating the maximum number of potential anomalies present is based on the modified data set, performing the set of comparisons is based on the modified set of values and determining whether one or more anomalies are present is based on the modified data set.

14. The non-transitory computer-readable medium of claim 10, wherein the operations further comprise:
receiving, via the user interface, a confidence level, the confidence level identifying a desired sensitivity indicating a tolerance for incorrectly identified anomalies; and
providing a confidence interval for each of the one or more determined anomalies, wherein each confidence interval is based on the received confidence level, and each confidence interval indicates a probability that the determined anomaly is incorrectly identified.

15. The non-transitory computer-readable medium of claim 10, wherein determining whether the one or more anomalies are present in the data set is based on a generalized extreme standardized deviate test (GESD test).

16. An anomaly identification system for determining a number of anomalies present in a data set, the anomaly identification system comprising:
a means for receiving, via a user interface, a data set, the data set comprising a set of values related to a metric;
an anomaly estimation module configured for estimating a maximum number of potential anomalies present in the data set, wherein the maximum number of potential anomalies is estimated based on a quantity of data points outside of an adjusted box plot applied to the data set;
an anomaly identification module configured for performing a set of comparisons based on the set of values, wherein a quantity of comparisons is based on the estimated maximum number of potential anomalies;
the anomaly identification module further configured for determining, based on the performed set of comparisons, that one or more anomalies are present in the data set; and
a means for providing, via a display device, an indication of the one or more determined anomalies.

17. The system of claim 16, wherein the received data set corresponds to a first period of time, and the system further comprises:
a means for receiving a second data set comprising a second set of values related to the metric wherein the second set of values corresponds to a second period of time occurring prior to the first period of time; and
a means for determining a modified data set comprising a modified set of values by subtracting the second data set from the data set,
wherein estimating the maximum number of potential anomalies present is based on the modified data set, performing the set of comparisons is based on the modified set of values, and determining whether one or more anomalies are present is based on the modified data set.

18. The system of claim 16, wherein the system further comprises:
a means for determining that the data set is skewed; and
a means for, responsive to determining that the data set is skewed, determining a modified data set comprising a modified set of values by transforming the data set,
wherein estimating the maximum number of potential anomalies present is based on the modified data set, performing the set of comparisons is based on the modified set of values, and determining whether one or more anomalies are present is based on the modified data set.

19. The system of claim 16, wherein the system further comprises:
a means for determining that the data set has a trend component; and
a means for, responsive to determining that the data set has a trend component, determining a modified data set comprising a modified set of values by removing the trend component from the data set,
wherein estimating the maximum number of potential anomalies present is based on the modified data set, performing the set of comparisons is based on the modified set of values, and determining whether one or more anomalies are present is based on the modified data set.

20. The system of claim 16, wherein determining whether the one or more anomalies are present in the data set is based on a generalized extreme standardized deviate (GESD test).

* * * * *